(12) United States Patent
Yang et al.

(10) Patent No.: US 12,519,560 B2
(45) Date of Patent: Jan. 6, 2026

(54) MODULATION AND CODING SCHEME (MCS) TABLE DESIGN FOR NON-GAUSSIAN CHANNELS

(71) Applicant: QUALCOMM Incorporated, San Diego, CA (US)

(72) Inventors: Wei Yang, San Diego, CA (US); Jing Jiang, San Diego, CA (US)

( * ) Notice: Subject to any disclaimer, the term of this patent is extended or adjusted under 35 U.S.C. 154(b) by 477 days.

(21) Appl. No.: 18/183,746

(22) Filed: Mar. 14, 2023

(65) Prior Publication Data

US 2024/0313880 A1    Sep. 19, 2024

(51) Int. Cl.
*H04W 72/20* (2023.01)
*H04L 1/00* (2006.01)
*H04L 27/26* (2006.01)

(52) U.S. Cl.
CPC .......... *H04L 1/0003* (2013.01); *H04W 72/20* (2023.01); *H04L 27/2602* (2013.01)

(58) Field of Classification Search
CPC ..................................................... H04W 72/00
USPC ................................. 370/329, 401, 402, 403
See application file for complete search history.

(56) References Cited

U.S. PATENT DOCUMENTS

2022/0116157 A1* 4/2022 Papasakellariou .... H04L 1/1664

* cited by examiner

*Primary Examiner* — Dang T Ton

(57) ABSTRACT

This disclosure provides systems, methods, and devices for wireless communication that support modulation and coding scheme (MCS) table design for non-Gaussian channels. In a first aspect, a method of wireless communication performed at a wireless communication device includes encoding information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The method further includes transmitting the encoded information to a second wireless communication device. Other aspects and features are also claimed and described.

30 Claims, 9 Drawing Sheets

*900*

902 Encode information in accordance with a channel code rate selected from modulation and coding scheme (MCS) data to generate encoded information, the MCS data representing a MCS table having at least one pair of entries that correspond to different modulation orders and for which a spectral efficiency associated with an entry having a higher modulation order is less than or equal to a spectral efficiency associated with an entry having a lower modulation order

904 Transmit the encoded information to a second wireless communication device

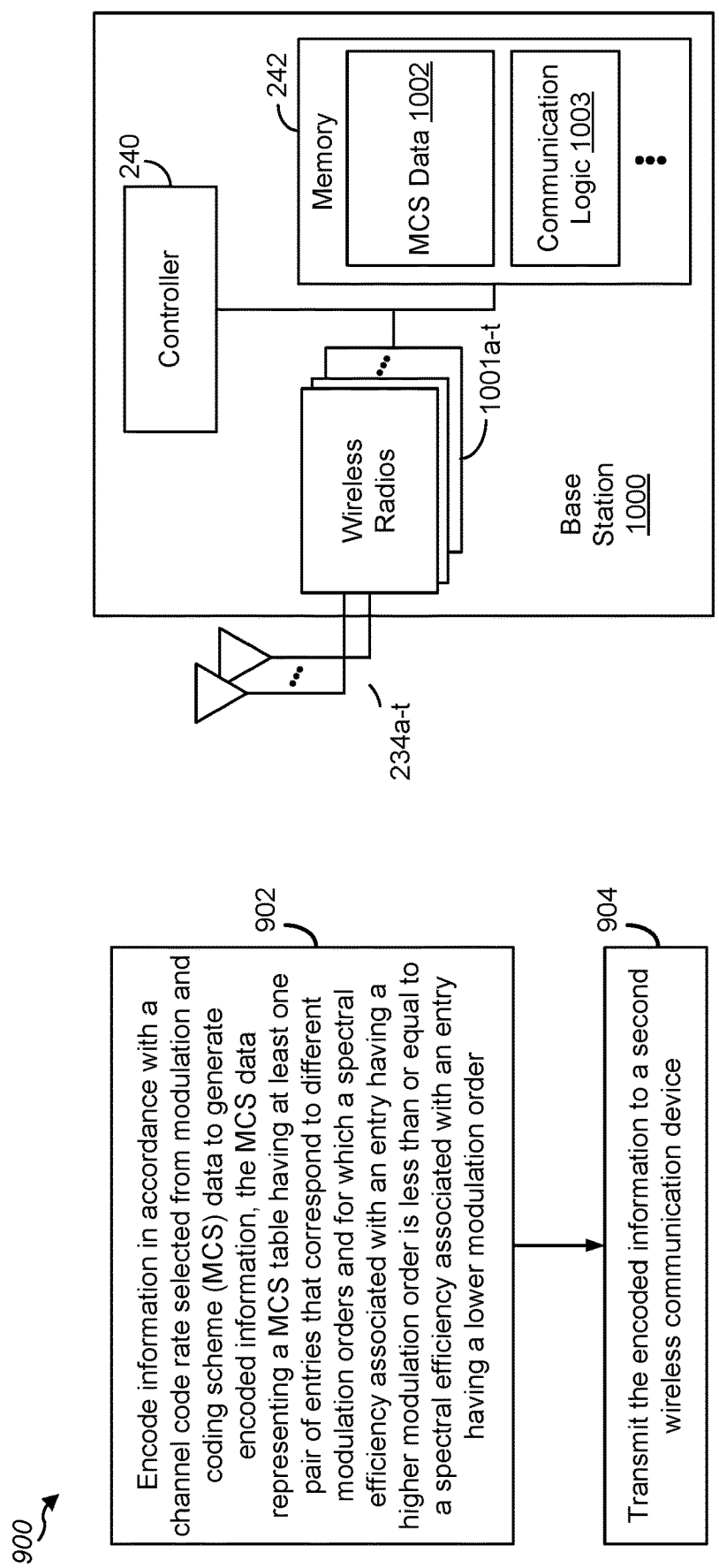

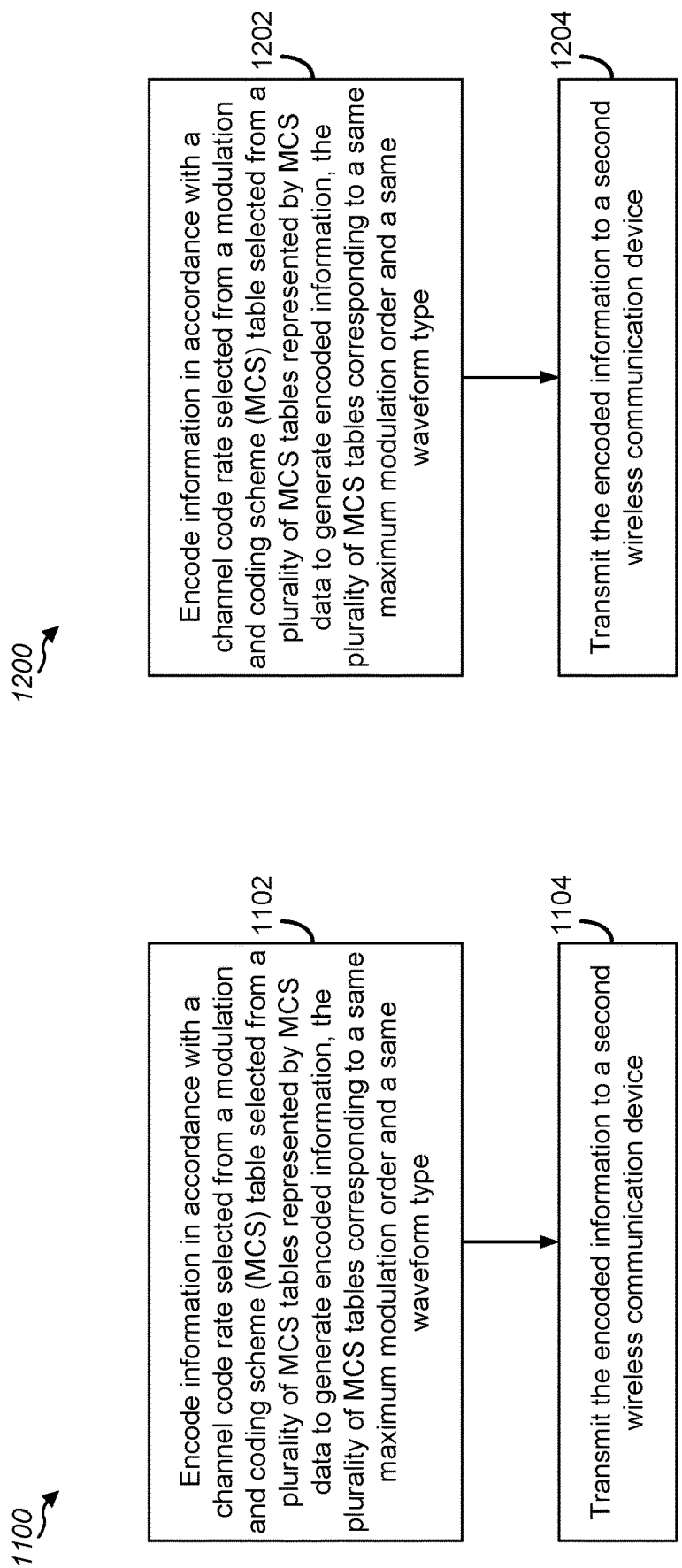

MODULATION AND CODING SCHEME (MCS) TABLE DESIGN FOR NON-GAUSSIAN CHANNELS

TECHNICAL FIELD

Aspects of the present disclosure relate generally to wireless communication systems, and more particularly, to modulation and coding scheme (MCS) table design for non-Gaussian channels. Some features may enable and provide improved communications, including improved throughput for communications over non-Gaussian wireless communication channels.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

As wireless communication technologies have advanced, there is increased demand for higher data rates in wireless transmissions. One technique for improving data rates over wireless communication channels is adaptive coding and modulation (ACM), which automatically changes the forward error correction (FEC) and modulation order to adapt to conditions of a wireless communication channel. ACM is typical performed using a modulation and coding scheme (MCS) table that contains different coding rate entries for different modulation orders, which is often defined by a wireless communication standard. MCS table design is optimized for Gaussian channels, particular an additive white Gaussian noise (AWGN) channel. For example, a MCS table may contain entries of modulation order and coding rate that have about 1 decibel (dB) of spacing between consecutive entries of an AWGN channel. As a result, the spectral efficiency of associated with the MCS table entries is monotonically increasing with respect to index values of the entries. Although this MCS table design is effective for balancing high data rate with sufficient error coding to reduce errors, and thus retransmissions, for Gaussian channels, the benefits are degraded when the MCS table is used to perform ACM for communication over non-Gaussian channels (e.g., a communication channel that is not represented by an AWGN channel).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a wireless communication device. The method includes encoding information in accordance with a channel code rate selected from modulation and coding scheme (MCS) data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The method also includes transmitting the encoded information to a second wireless communication device.

In an additional aspect of the disclosure, a wireless communication device includes a memory and at least one processor coupled to the memory. The memory stores processor-readable code. The at least one processor is configured to execute the processor-readable code to cause the at least one processor to encode information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. Execution of the processor-readable code also causes the at least one processor to initiate transmission of the encoded information to a second wireless communication device.

In an additional aspect of the disclosure, an apparatus includes means for encoding information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The apparatus further includes means for transmitting the encoded information to a second wireless communication device.

In an additional aspect of the disclosure, a non-transitory computer-readable medium stores instructions that, when executed by a processor, cause the processor to perform operations. The operations include encoding information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The operations further include initiating transmission of the encoded information to a second wireless communication device.

In an additional aspect of the disclosure, an apparatus includes at least one processor coupled to a memory storing processor-readable code. The at least one processor is configured to execute the processor-readable code to cause the at least one processor to encode information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The apparatus further includes a communication interface configured to transmit the encoded information to a second wireless communication device.

In an additional aspect of the disclosure, a method for wireless communication is performed by a wireless communication device. The method includes encoding information in accordance with a channel code rate selected from a MCS table selected from a plurality of MCS tables represented by MCS data to generate encoded information. The plurality of MCS tables corresponds to a same maximum modulation order and a same waveform type. The method further includes transmitting the encoded information to a second wireless communication device.

In an additional aspect of the disclosure, a wireless communication device includes a memory and at least one processor coupled to the memory. The memory stores processor-readable code. The at least one processor is configured to execute the processor-readable code to cause the at least one processor to encode information in accordance with a channel code rate selected from a MCS table selected from a plurality of MCS tables represented by MCS data to generate encoded information. The plurality of MCS tables corresponds to a same maximum modulation order and a same waveform type. Execution of the processor-readable code also causes the at least one processor to initiate transmission of the encoded information to a second wireless communication device.

In an additional aspect of the disclosure, an apparatus includes means for encoding information in accordance with a channel code rate selected from a MCS table selected from a plurality of MCS tables represented by MCS data to generate encoded information. The plurality of MCS tables corresponds to a same maximum modulation order and a same waveform type. The apparatus further includes means for transmitting the encoded information to a second wireless communication device.

In an additional aspect of the disclosure, a non-transitory computer-readable medium stores instructions that, when executed by a processor, cause the processor to perform operations. The operations include encoding information in accordance with a channel code rate selected from a MCS table selected from a plurality of MCS tables represented by MCS data to generate encoded information. The plurality of MCS tables corresponds to a same maximum modulation order and a same waveform type. The operations further include initiating transmission of the encoded information to a second wireless communication device.

In an additional aspect of the disclosure, an apparatus includes at least one processor coupled to a memory storing processor-readable code. The at least one processor is configured to execute the processor-readable code to cause the at least one processor to encode information in accordance with a channel code rate selected from a MCS table selected from a plurality of MCS tables represented by MCS data to generate encoded information. The plurality of MCS tables corresponds to a same maximum modulation order and a same waveform type. The apparatus further includes a communication interface configured to transmit the encoded information to a second wireless communication device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating an example process that supports MCS table design for non-Gaussian channels according to one or more aspects.

FIG. 10 is a block diagram of an example base station that supports MCS table design for non-Gaussian channels according to one or more aspects.

FIG. 11 is a flow diagram illustrating an example process that supports MCS table design for non-Gaussian channels according to one or more aspects.

FIG. 12 is a flow diagram illustrating an example process that supports MCS table design for non-Gaussian channels according to one or more aspects.

Like reference numbers and designations in the various drawings indicate like elements.

DETAILED DESCRIPTION

Figure 1:
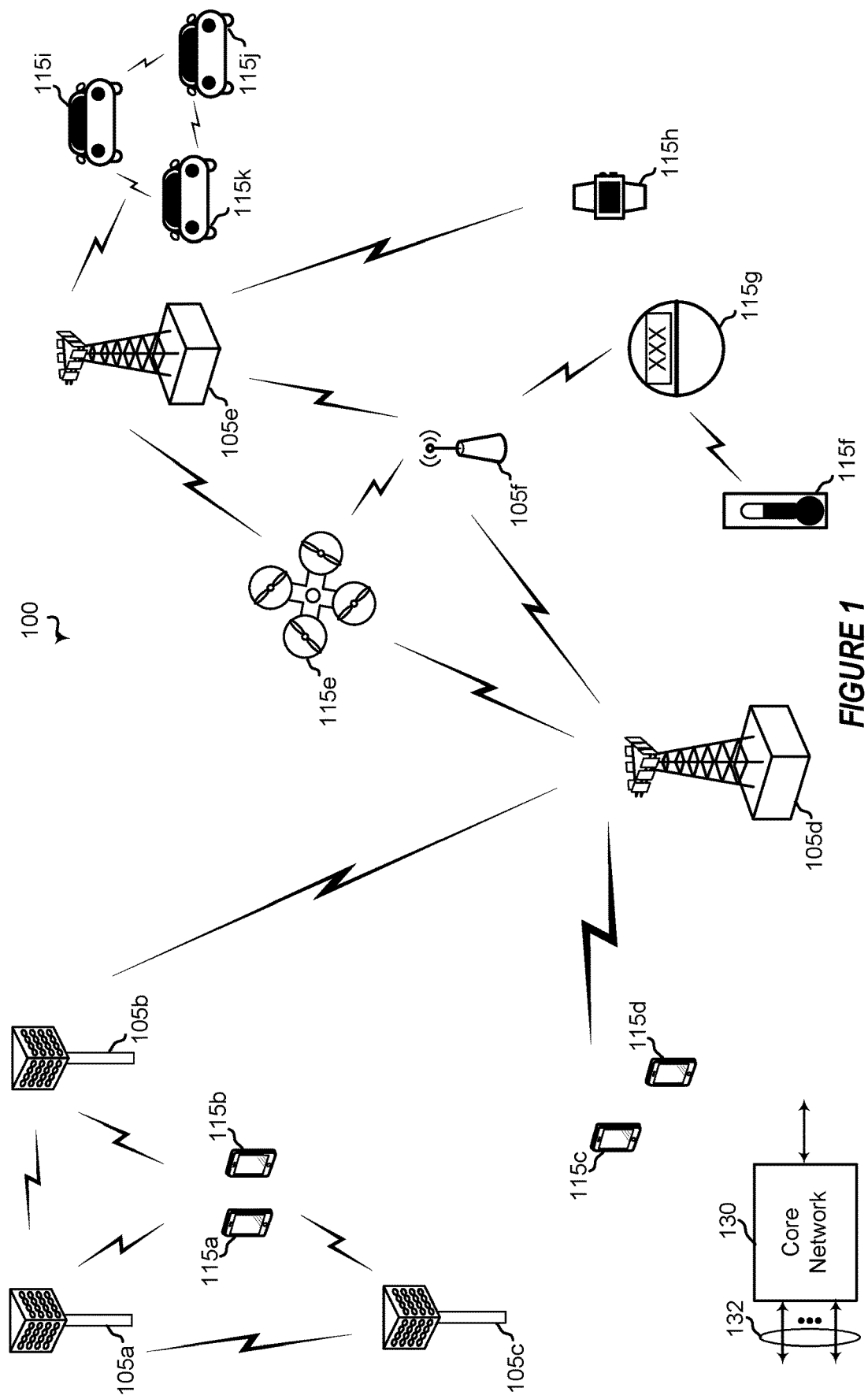
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support modulation and coding scheme (MCS) table design for non-Gaussian channels. For example, the present disclosure describes MCS table design that provides improved performance when used to perform adaptive coding and modulation (ACM) to communicate via non-Gaussian wireless communication channels, such as fading channels and multiple input, multiple output (MIMO) channels, particularly at transition points between modulation orders. To illustrate, conventional MCS table design is to be suitable for communication over an additive white Gaussian noise (AWGN) channel, and entries are spaced apart by approximately 1 decibel (dB) on an AWGN channel and thus have monotonically increasing spectral efficiency with respect to index values of the entries. However, particularly at transition points from an entry with a lower modulation order and a higher coding rate to a higher modulation order and a lower coding rate, the performance of wireless communication using such MCS table design is not smooth. To illustrate, although the MCS table entries are designed to be spaced apart by 1 dB (e.g., of a signal-to-noise ratio (SNR)) in an AWGN channel, in a fading or MIMO channel, the difference may be larger, such as greater than 5 dBs. This larger different results in less smooth throughput when transitioning between modulation orders according to the values in the MCS table, thereby degrading throughput at least for certain combination of modulation order and channel coding rate. To improve throughput of wireless communications via fading or MIMO channels, the present disclosure provides MCS table design that accounts for the differences between fading or MIMO channels and an AWGN channel.

To illustrate, a wireless communication device may encode information in accordance with a channel code rate (CCR) selected from MCS data stored at the wireless communication device to generate encoded information. The MCS data may represent an MCS table having at least one pair of entries that correspond to different modulation orders and are not increasing in spectral efficiency with respect to modulation order (e.g., a spectral efficiency associated with an entry having a higher modulation order is less than or equal to a spectral efficiency associated with an entry having a lower modulation order). For example, the spectral efficiency associated with the entry having the higher modulation order of the pair may be the same as the spectral efficiency associated with the entry having the lower modulation order of the pair. As another example, the spectral efficiency associated with the entry having the higher modulation order of the pair may be less than the spectral efficiency associated with the entry having the lower modulation order of the pair. Designing an MCS table such that pairs of entries having different modulation orders, particularly entries near the transition point from one modulation order to another modulation order, are not increasing in spectral efficiency with respect to modulation order may enable a smoother throughput when the wireless communication device transmits the encoded information to a second wireless communication device via a fading channel or a MIMO channel. Although the above-described example is described in the context of encoding information and transmitting encoded information by the wireless communication device, similar operations may be performed for decoding encoded information received from the second wireless communication device.

In some implementations, a single MCS table may be designed that allows matching, overlapping, or decreasing spectral efficiency with different modulation orders. For example, a first MCS table entry that includes a 64 quadrature amplitude (QAM) modulation order and a CCR of 910/1024 may be associated with a spectral efficiency of 5.332, and a second MCS table entry that consecutively follows the first MCS table entry may include a 256 QAM modulation order and a CCR of 682.5/1024, and therefor be associated with a spectral efficiency of 5.332 (e.g., the same spectral efficiency). As another example, a first MCS table entry that includes a 64 QAM modulation order and a CCR of 910/1024 may be associated with a spectral efficiency of 5.332, and a second MCS table entry that consecutively follows the first MCS table entry may include a 256 QAM modulation order and a CCR of 666/1024, and therefore be associated with a spectral efficiency of 5.2 (e.g., a spectral efficiency that is less than the spectral efficiency associated with the first MCS table entry).

Additionally or alternatively, the MCS data may represent multiple MCS tables that correspond to a same maximum modulation order and a same waveform type, and the wireless communication device may select which MCS table to use to select a CCR based on information from the second wireless communication device or channel conditions detected at the wireless communication device. For example, instead of having a single MCS table for each combination of maximum modulation order and waveform type, there may be at least two MCS tables for each combination: an MCS table suitable for communication over an AWGN channel and an MCS table suitable for communication over fading or MIMO channels (e.g., an MCS table having at least one pair of consecutive entries for which the associated spectral efficiency is not increasing with respect to index value). The transitions between different modulation orders in the at least two MCS tables may occur at different spectral efficiency points due to the designs.

In some multiple MCS table implementations, the second wireless communication device selects the MCS table based on one or more communication parameter values configured for wireless communications between the second wireless communication device and the first wireless communication device. For example, the first wireless communication device may be a user equipment (UE), the second wireless communication device may be a network entity, such as a base station, and the base station may select the MCS table based on one or more communication parameter values associated with uplink or downlink communications between the UE and the base station, such as a number of MIMO layers, a bandwidth part (BWP) index, a frequency range, a subcarrier spacing (SCS) value, a waveform type, a grant parameter value, a bandwidth value, a rank, or a combination thereof, as non-limiting examples. As an example, the base station (or the UE) may select the MCS table based on a selected frequency range, such as selecting a first MCS table for the frequency range of 0-6 gigahertz (GHz), a second MCS table for the frequency range of 7-14 GHZ, a third MCS table for the frequency range of 25-40 GHz, a fourth MCS table for 60 GHZ, a fifth MCS table for the frequency range of 65-80 GHz, or a sixth MCS table for a sub terahertz (THz) range. As another example, a different MCS table may be selected based on rank, such as a first MCS table for ranks that are less than or equal to two or a second MCS table for ranks that are greater than two. As another example, the MCS table may be selected based on subcarrier spacing (SCS), such as a first MCS table for SCS below 60 kilohertz (kHz) or a second MCS table for SCS between 60 kHz and 240 kHz. In some such implementations, the base station transmits a message that indicates the selected MCS table to the UE (e.g., an explicit MCS instruction). Alternatively, the base station may transmit one or more messages indicating the configured communication parameter values to the UE, and the UE selects the MCS table based on the communication parameter values (e.g., an implicit MCS instruction). In some other implementations, the UE may perform one or more channel measurements (e.g., based on a channel state information reference signal (CSI-RS) or a demodulation reference signal (DMRS)), and the UE may select the MCS table based on the channel measurements. In such implementations, the UE may transmit a MCS recommendation message that indicates the MCS table to the base station. In some other implementations, the UE may select the MCS table based on a receiver architecture (e.g., receiver type) at the UE, and the UE may transmit a MCS recommendation message that indicates the MCS table to the base station. For example, the UE may select a different MCS table based on whether the UE uses a non-linear MIMO receiver or a linear MIMO receiver. Although the above-described examples include a UE and a base station (or other network entity), in other implementations, the wireless communication devices may both be UEs, and the selection of MCS table may be based on one or more sidelink (SL) communication parameters or channel measurements.

In some implementations, each MCS table entry includes an index value, a modulation order, and a CCR, and the wireless communication device selects a CCR from the selected MCS table based on a modulation order and an index value of a previously selected entry (e.g., is the wireless communication device increasing the index value to increase the throughput or decreasing the index value to decrease an error rate). In some other implementations, the MCS table entries may further include a probabilistic shaping rate, and the CCR may be selected based on the modulation order, the probabilistic shaping rate, and the previous index value. In some other implementations, one or more MCS tables may correspond to different probabilistic shaping values, and the MCS table may be selected based on a target probabilistic shaping value.

Particular implementations of the subject matter described in this disclosure may be implemented to realize one or more of the following potential advantages or benefits. In some aspects, the present disclosure provides techniques for supporting MCS table design for non-Gaussian channels. The techniques described provide MCS tables that provide improved throughput for wireless communications via fading or MIMO channels that differ from an AWGN channel, particularly at transition points between different modulation orders. For example, a MCS table may be designed such that at least one pair of consecutive entries are associated with spectral efficiencies that are the same or that decrease with respect to index value. Such entries may result in smoother throughput changes and increased throughput when a wireless communication device adaptively changes a modulation order and a CCR used to perform wireless communications via a fading or MIMO channel. Additionally, the MCS table design described herein enables use of higher coding rates for lower modulation orders at transition points between different modulation orders, which reduces the decoding and demodulation complexity at these transition points.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS)

requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115c, which is a drone. Redundant communication links with UE 115e include from macro base stations 105d and 105c, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Figure 2:
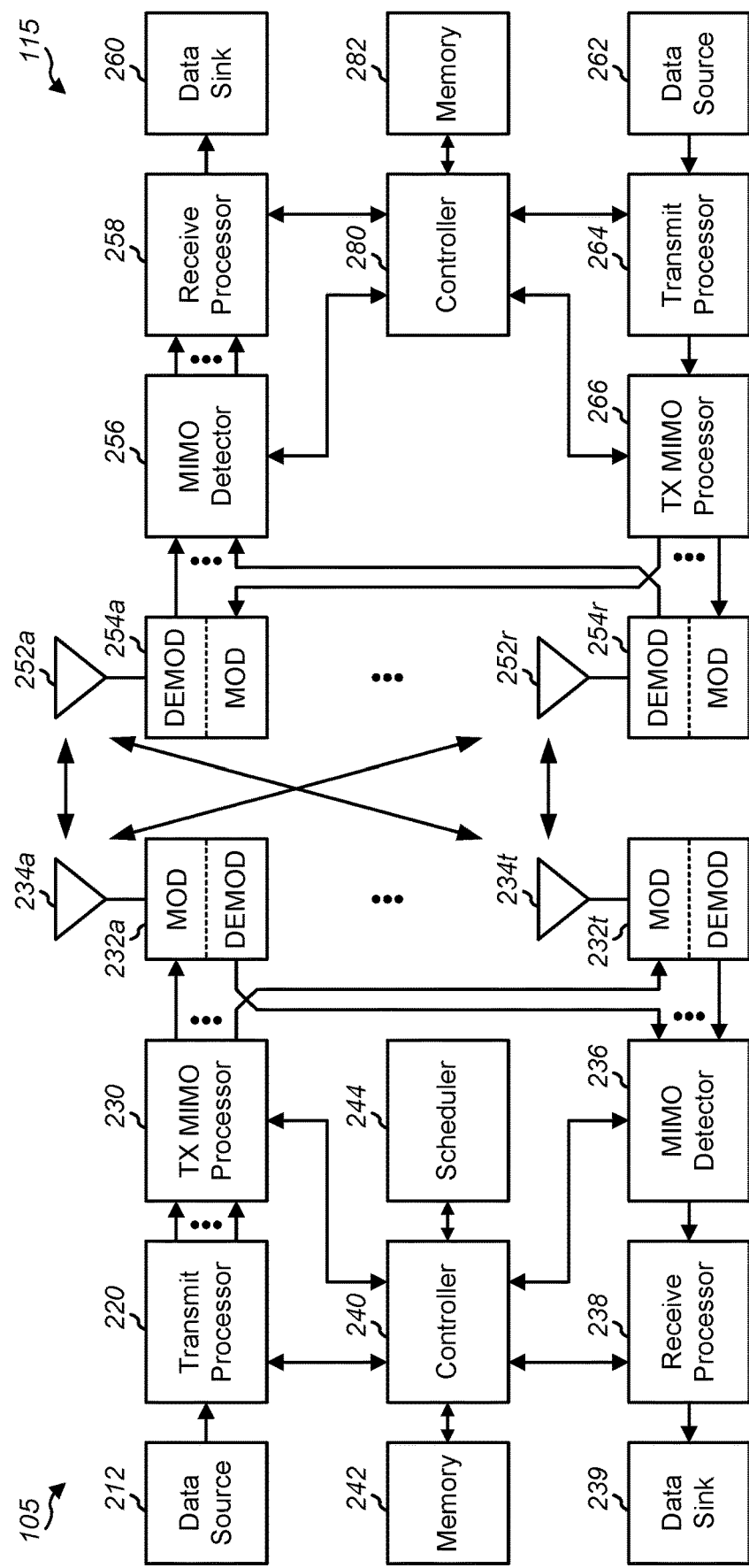
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7, 9, 11, and 12, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
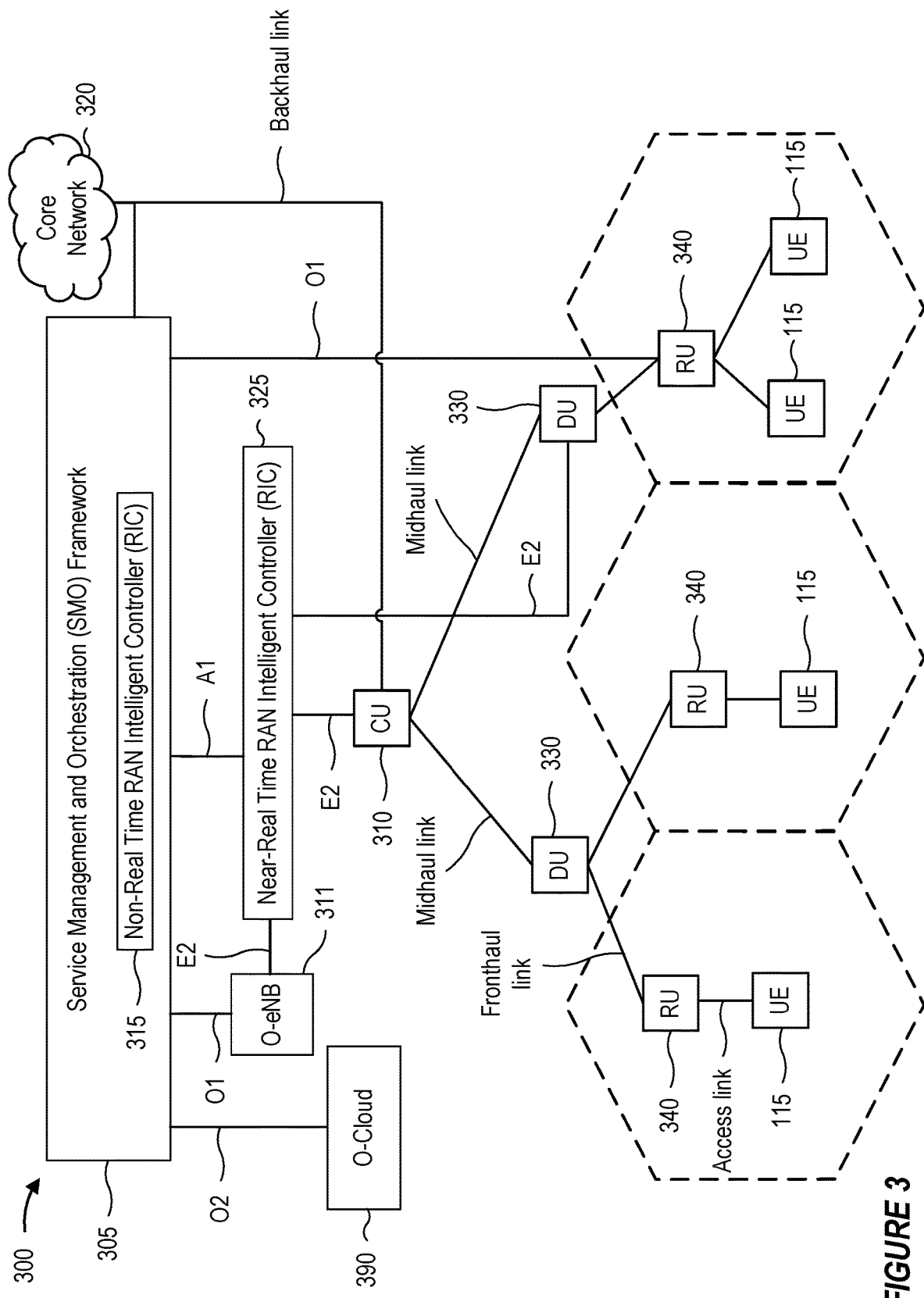
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUS 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
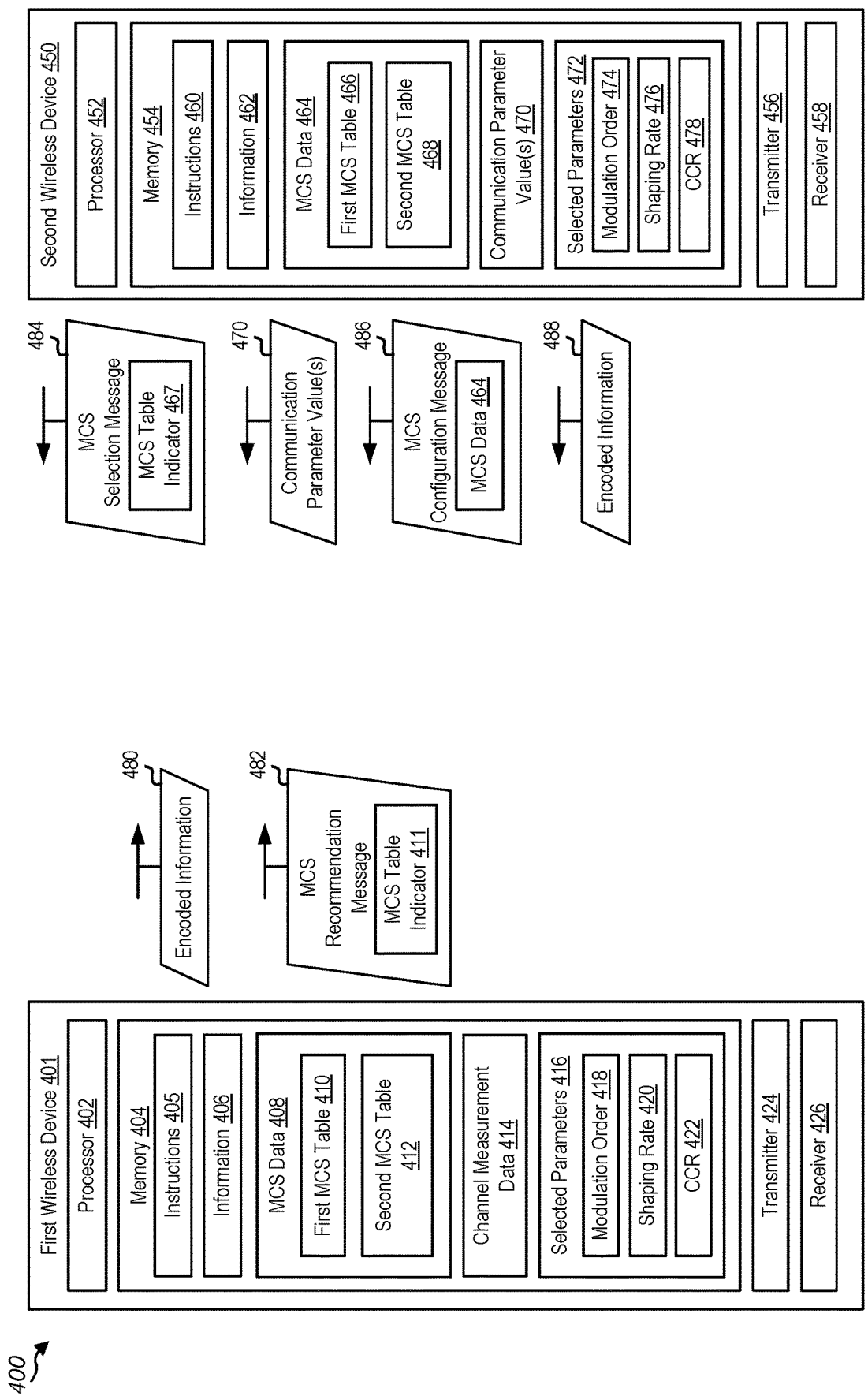
FIG. 4 is a block diagram illustrating an example wireless communication system that supports modulation and coding scheme (MCS) table design for non-Gaussian channels according to one or more aspects.

FIG. 4 is a block diagram of an example wireless communications system 400 that supports MCS table design for non-Gaussian channels according to one or more aspects. In some examples, wireless communications system 400 may implement aspects of wireless network 100. Wireless communications system 400 includes first wireless communication device 401 and second wireless communication device 450. Although two wireless communication devices 401 and 450 are illustrated, in some other implementations, wireless communications system 400 may generally include more than two wireless communication devices. In some implementations, first wireless communication device 401 may include or correspond to UE 115 of FIGS. 1-3, and second wireless communication device 450 may include or correspond to base station 105 of FIGS. 1-3. In some other implementations, first wireless communication device 401 and second wireless communication device 450 may both include or correspond to UEs (e.g., UE 115 of FIGS. 1-3).

First wireless communication device 401 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 424 (hereinafter referred to collectively as "transmitter 424"), and one or more receivers 426 (hereinafter referred to collectively as "receiver 426"). In some implementations, first wireless communication device 401 may include an interface (e.g., a communication interface) that includes transmitter 424, receiver 426, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405, information 406, MCS data 408, channel measurement data 414, and selected parameters 416. Information 406 may include data to be transmitted to second wireless communication device 450 after performance of one or more encoding operations. MCS data 408 may represent one or more MCS tables to be used by first wireless communication device 401 to perform the one or more encoding operations, one or more decoding operations, or a combination thereof. Channel measurement data 414 may represent results of one or more channel measurement operations performed by first wireless communication device 401. Selected parameters 416 may include one or more MCS parameters selected for use in encoding data to be transmitted to second wireless communication device 450, to decode encoded data received from second wireless communication device 450, or both.

Transmitter 424 is configured to transmit reference signals, control information and data to one or more other devices, and receiver 426 is configured to receive references signals, synchronization signals, control information and data from one or more other devices. For example, transmitter 424 may transmit signaling, control information and data to, and receiver 426 may receive signaling, control information and data from, second wireless communication device 450. In some implementations, transmitter 424 and receiver 426 may be integrated in one or more transceivers. Additionally or alternatively, transmitter 424 or receiver 426 may include or correspond to one or more components of UE 115 described with reference to FIG. 2.

In some implementations, first wireless communication device 401 may include one or more antenna arrays. The one or more antenna arrays may be coupled to transmitter 424, receiver 426, or a communication interface. The antenna array may include multiple antenna elements configured to perform wireless communications with other devices, such as with second wireless communication device 450. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of first wireless communication device 401. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Second wireless communication device 450 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, second wireless communication device 450 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store instructions 460, information 462, MCS data 464, one or more communication parameter values (hereinafter referred to collectively as "communication parameter values 470"), and selected parameters 472. Information 462 may include data to be transmitted to other wireless communication devices, such as first wireless communication device 401, after performance of one or more encoding operations. MCS data 464 may represent one or more MCS tables to be used by second wireless communication device 450 to perform the one or more encoding operations, one or more decoding operations, or a combination thereof. For example, MCS data 464 may include or correspond to MCS data 408 stored at first wireless communication device 401. Communication parameter values 470 may represent configured parameter values for wireless communications with first wireless communication device 401. Selected parameters 472 may include one or more MCS parameters selected for use in encoding data to be transmitted to first wireless communication device 401, to decode encoded data received from first wireless communication device 401, or both.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, first wireless communication device 401. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, second wireless communication device 450 may include one or more antenna arrays. The antenna array may include multiple antenna elements configured to perform wireless communications with other devices, such as with first wireless communication device 401. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of second wireless communication device 450. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communications system 400 implements a 5G NR network. For example, wireless communications system 400 may include multiple 5G-capable UEs and multiple 5G-capable base stations, such as UEs and base stations configured to operate in accordance with a 5G NR network protocol such as that defined by the 3GPP. In some other implementations, wireless communications system 400 implements a 6G network.

During operation of wireless communications system 400, first wireless communication device 401 may generate information 406 for transmission to second wireless communication device 450. For example, first wireless communication device 401 may execute one or more applications (e.g., "higher layer" applications) that access a service provided by second wireless communication device 450 or otherwise involve performing wireless communications with second wireless communication device 450. First wireless communication device 401 and second wireless communication device 450 may be configured to perform AMC as part of a wireless communication between the devices, and first wireless communication device 401 may be configured to encode information 406 based on one or more of selected parameters 416 as part of an AMC process. For example, first wireless communication device 401 may be configured to encode information 406 based at least on a selected modulation order and channel code rate (CCR) (e.g., modulation order 418 and CCR 422, respectively). Modulation order 418 may indicate a number of bits that can be carried by a single resource element (RE) and may be selected from one of multiple supported modulation orders. As a non-limiting example, the supported modulation orders may include quadrature phase shift keying (QPSK), 16 quadrature amplitude modulation (QAM), 64 QAM, 256 QAM, and 1024 QAM. In other implementations, other modulation orders may be supported. CCR 422 may indicate a ratio between useful bits in the RE to total bits in the RE (e.g., a combination of the useful bits and redundant bits, such as error correction coding bits). CCR 422 may be selected based on modulation order 418 and a link quality of a communication link between first wireless communication device 401 and second wireless communication device 450 and a target block error rate (BLER).

To select CCR 422 for use in encoding information 406, first wireless communication device 401 may access an MCS table represented by MCS data 408. For example, first wireless communication device 401 may receive an MCS table index from second wireless communication device 450, or first wireless communication device 401 may otherwise determine an MCS table index of a target entry, and first wireless communication device 401 may access MCS data 408 to identify the CCR that corresponds to the MCS table index as CCR 422. MCS data 408 may represent at least one MCS table (e.g., first MCS table 410) that is designed for use in wireless communications via non-Gaussian channels, such as fading or MIMO channels that differ from an AWGN channel. For example, first MCS table 410 may have at least one pair of consecutively indexed entries that correspond to different modulation orders and for which a spectral efficiency associated with a higher indexed entry is less than or equal to a spectral efficiency associated with a lower entry. Stated another way, spectral efficiency may not monotonically increase with respect to index value for all entries of first MCS table 410, unlike in MCS tables designed for Gaussian channels in which the spectral efficiency associated with entries monotonically increases with respect to index value. This MCS table design of first MCS table 410 may result in smoother throughput changes when shifting between use of CCRs from one modulation order to a different modulation order for performing wireless communications with second wireless communication device 450 via one or more fading or MIMO channels.

Figures 5A, 5B:
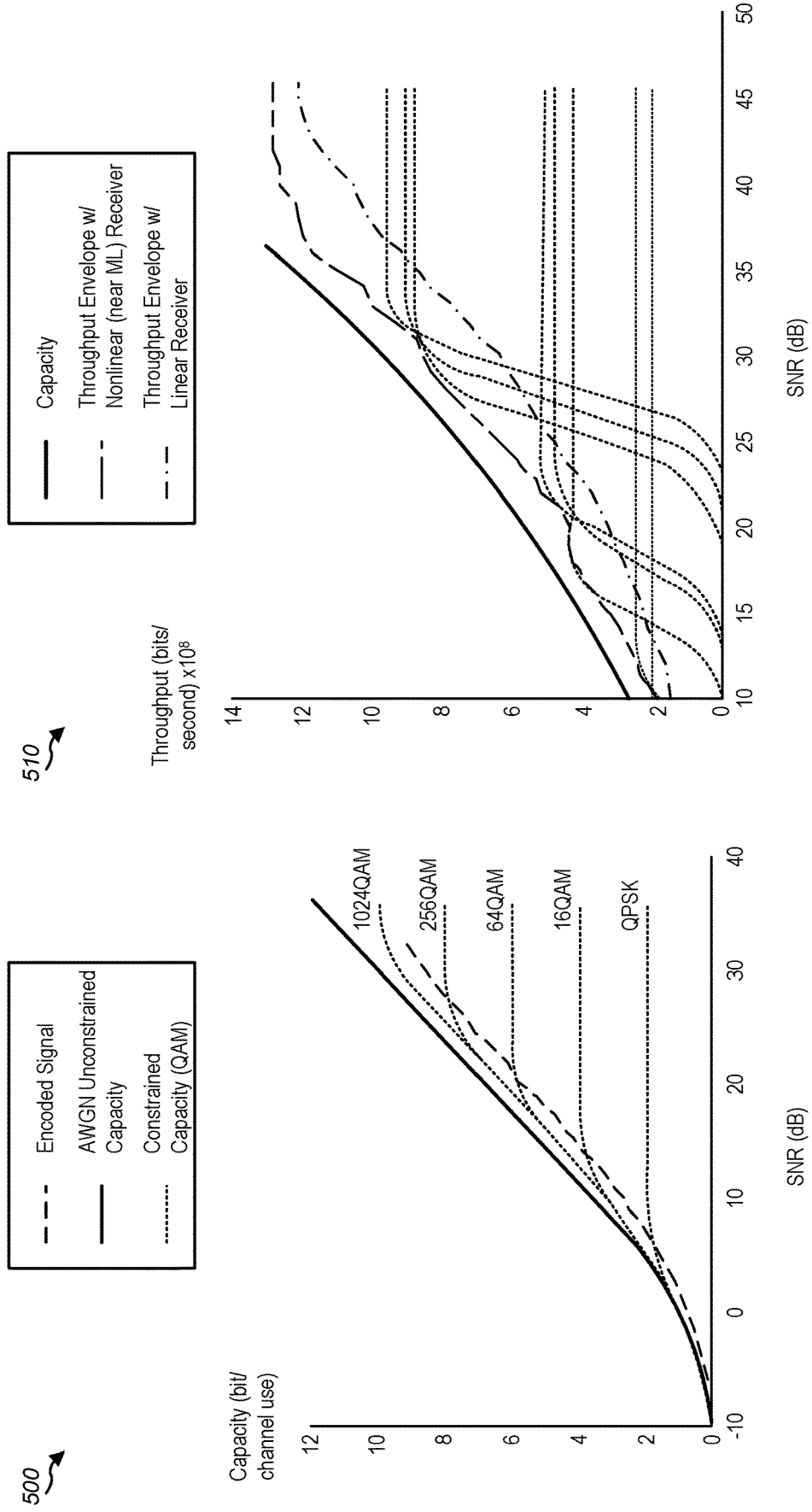
FIGS. 5A and 5B depict examples of capacity and throughput for one or more signals encoded in accordance with parameters selected from a MCS table designed for Gaussian channels according to one or more aspects.

FIGS. 5A and 5B depict examples of capacity and throughput for one or more signals encoded in accordance with parameters selected from a MCS table designed for Gaussian channels according to one or more aspects. FIG. 5A depicts a first example 500 of capacity for an encoded signal that is communicated over an AWGN channel and that is encoded using a MCS table that is designed for Gaussian channels, in addition to the constrained capacity for particular modulation orders and an AWGN unconstrained capacity. As can be seen from the first example 500, the encoded signal has uniform spacing over signal to noise ratio (SNR), and throughput increases smoothly with SNR, even across transitions between different modulation orders (e.g., QPSK to 16 QAM or 16 QAM to 64 QAM, as non-limiting examples). A partial example of a MCS table associated with first example 500 is provided below as Table 1, which shows that spectral efficiency increases with respect to index value, regardless of modulation order and CCR.

TABLE 1

Example of Partial MCS Table Designed for Gaussian Channels

| MCS Index | Modulation Order | Target CCR | Spectral Efficiency |
|---|---|---|---|
| 18 | 64 QAM | 822/1024 | 4.8164 |
| 19 | 64 QAM | 873/1024 | 5.1152 |
| 20 | 256 QAM | 682.5/1024 | 5.3320 |
| 21 | 256 QAM | 711/1024 | 5.5547 |

FIG. 5B depicts a second example 510 of throughput for an encoded signal that is communicated over a fading MIMO channel and that is encoded using the same MCS table. The throughput is measured using a non-linear (near ML) receiver. As can be seen from the second example 510, the performance of the encoded signal does not increase smoothly with SNR. Much of the degraded performance results from the MCS table design, as the SNR difference between adjacent MCS table entries is 1 dB on the AWGN channel but can become much larger on the fading MIMO channel, such as greater than 5 dB in the 16 QAM to 64 QAM transition region. Second example 510 also shows throughput for an encoded signal that uses a less complex linear receiver. As can be seen from second example 510, the throughput of the encoded signal with the linear receiver increases more smoothly with SNR. This may be due to the linear receiver trying to convert the fading MIMO channel into a point-to-point (e.g., AWGN) channel and to treat the MIMO inter-layer interference as noise. As can be seen, the performance of the encoded signal with the non-linear receiver is less smooth than that of a less complex receiver, and as such, MCS table design for fading and MIMO channels can improve performance of wireless communications over such channels.

To illustrate, a MCS table may be designed to smooth and/or improve the throughput, particularly in regions of transition between different modulation orders, by relaxing the requirement that spectral efficiency increase with respect to index value for all entries. As an example, a first entry of a first pair of entries of first MCS table 410 may include a first modulation order and may be associated with a first spectral efficiency, and a second entry of the first pair of entries may include a second modulation order that is greater than the first modulation order and be associated with a second spectral efficiency that is less than the first spectral efficiency. A partial example of such an MCS table is provided by Table 2 below. As can be seen from Table 2, the spectral efficiency of a first entry associated with a higher modulation order (e.g., 256 QAM) is less than the spectral efficiency of the last entry associated with a lower modulation order (e.g., 64 QAM).

TABLE 2

Example of Partial MCS Table Designed for Non-Gaussian Channels

| MCS Index | Modulation Order | Target CCR | Spectral Efficiency |
|---|---|---|---|
| 18 | 64 QAM | 822/1024 | 4.8164 |
| 19 | 64 QAM | 910/1024 | 5.332 |
| 20 | 256 QAM | 666/1024 | 5.2 |
| 21 | 256 QAM | 682.5/1024 | 5.332 |

As another example, a first entry of a first pair of entries of first MCS table 410 may include a first modulation order and may be associated with a first spectral efficiency, and a second entry of the first pair of entries may include a second modulation order that is greater than the first modulation order and be associated with a second spectral efficiency that is the same as the first spectral efficiency. A partial example of such an MCS table is provided by Table 3 below. As can be seen from Table 3, the spectral efficiency of a first entry associated with a higher modulation order (e.g., 256 QAM) is the same as the spectral efficiency of the last entry associated with a lower modulation order (e.g., 64 QAM). Having the same or decreasing spectral efficiency associated with increasing modulation orders may allow selection of RRCs that increase throughput at these transition points between modulation orders in fading or MIMO channels.

TABLE 3

Example of Partial MCS Table Designed for Non-Gaussian Channels

| MCS Index | Modulation Order | Target CCR | Spectral Efficiency |
|---|---|---|---|
| 18 | 64 QAM | 822/1024 | 4.8164 |
| 19 | 64 QAM | 873/1024 | 5.1152 |
| 20 | 64 QAM | 910/1024 | 5.3320 |
| 21 | 256 QAM | 682.5/1024 | 5.3320 |

Returning to FIG. 4, after selecting CCR 422 from MCS data 408, first wireless communication device 401 may encode information 406 based on CCR 422 to generate encoded information 480, and first wireless communication device 401 may transmit encoded information 480 to second wireless communication device 450. Second wireless communication device 450 may receive encoded information 480 and decode encoded information 480 based on CCR 478 (which corresponds to CCR 422). Although the above-described example is provided in the context of encoding information for transmission at first wireless communication device 401, similar operations may be performed for decoding received information. To illustrate, second wireless communication device 450 may select CCR 478 from first MCS table 466 represented by MCS data 464, similar to as described above, and second wireless communication device 450 may encode information 462 to generate encoded information 488 that is transmitted to first wireless communication device 401. First wireless communication device 401 may select CCR 422 from first MCS table 410, as described above, in order to decode encoded information 488 based on CCR 422. In this manner, wireless communications between first wireless communication device 401 and second wireless communication device 450 may be performed using AMC techniques based on an MCS table (e.g., first MCS table 410 and first MCS table 466) that improves performance of wireless communications over fading or MIMO channels (e.g., non-Gaussian channels).

In some implementations, first wireless communication device 401 receives MCS data 408 from second wireless communication device 450. For example, second wireless communication device 450 may transmit MCS configuration message 486 to first wireless communication device 401, such as during an association process or other initial process to establish a wireless connection, or second wireless communication device 450 may periodically broadcast MCS configuration message 486. MCS configuration message 486 may include, or otherwise indicate, MCS data 464 that is preconfigured or otherwise stored at second wireless communication device 450. For example, MCS configuration message 486 may include one or more MCS tables (or data representative thereof), or MCS configuration message 486 may indicate indices of one or more MCS tables from a group of MCS tables known to multiple wireless communication devices. In response to receiving MCS configuration message 486, first wireless communication device 401 may store MCS data 464 included in MCS configuration message 486 as MCS data 408 at first wireless communication device 401. Alternatively, MCS data 408 may be preprogrammed or otherwise preconfigured (e.g., such as during an initial setup process, during one or more update operations, or the like) at first wireless communication device 401.

In some implementations, MCS data 408, and MCS data 464, represents a single MCS table for each combination of maximum modulation order and waveform type (of which there may be one or more combinations corresponding to different MCS tables). The maximum modulation order may include or correspond to QPSK. 16 QAM, 64 QAM, 256 QAM, 1024 QAM, or another modulation order, and the waveform type may include or correspond to a discrete Fourier transform-spread-orthogonal frequency division multiplexing (DFT-S-OFDM), cyclic prefix orthogonal frequency division multiplexing (CP-OFDM) waveform, a single-carrier quadrature amplitude modulated (SC-QAM), or another type of waveform. In some such implementations, MCS data 408 and MCS data 464 represent a single table. For example, second MCS table 412 and second MCS table 468 may not be included in MCS data 408 and MCS data 464, respectively. In some other implementations, MCS data 408 and MCS data 464 represent different MCS tables for different combinations of maximum modulation order and waveform type. As a non-limiting example, MCS data 408 may represent three MCS tables: first MCS table 410, second MCS table 412, and a third MCS table (not illustrated for convenience). In such an example, first MCS table 410 may have a maximum modulation order of 1024 QAM and correspond to a CP-OFDM waveform, second MCS table 412 may have a maximum modulation order of 1024 QAM and correspond to a DFT-S-OFDM waveform, and the MCS table may have a maximum modulation order of 1024 QAM and correspond to a SC-QAM waveform. First wireless communication device 401 may select which MCS table to access to determine CCR 422 based on a type of waveform used to communication with second wireless communication device 450 and a selected maximum modulation order. As an illustrative, non-limiting example, first wireless communication device 401 may select first MCS table 410 based on a selected maximum modulation order being 1024 QAM and a configured waveform type being a CP-OFDM waveform, and CCR 422 may be selected from within first MCS table 410 as described above. MCS data 464 may similarly represent multiple MCS tables, and second wireless communication device 450 may determine which MCS table to access to determine CCR 478 in a similar manner.

In some other implementations, MCS data 408, and MCS data 464, represent multiple MCS tables for at least one combination of maximum modulation order and waveform type. For example, first MCS table 410 and first MCS table 466 may have a particular maximum modulation order (e.g., one of QPSK, 16 QAM, 64 QAM, 256 QAM, or 1024 QAM) and correspond to a particular waveform type (e.g., one of DFT-S-OFDM, CP-OFDM, or SC-QAM), and second MCS table 412 and second MCS table 468 may have the same particular maximum modulation order (e.g., the same one of QPSK, 16 QAM, 64 QAM, 256 QAM, or 1024 QAM) and correspond to the same particular waveform type (e.g., the same one of DFT-S-OFDM, CP-OFDM, or SC-QAM). In some such implementations, the MCS tables may be designed for different types of channels (e.g., Gaussian channels or non-Gaussian channels or different receiver types) and thus may have at least some different values, particularly at entries on either side of the transition between modulation orders. For example, first MCS table 410 and first MCS table 466 may be designed to be suitable for communications over fading or MIMO channels (e.g., non-Gaussian channels), and second MCS table 412 and second MCS table 468 may be designed to be suitable for communications over an AWGN channel. As such, the MCS tables may provide smoother throughput changes when adaptively changing CCRs while communicating with different types of channels, and consequently first wireless communication device 401 and/or second wireless communication device 450 may select one of the multiple MCS tables based on one or more parameters that indicate a preference for the AWGN-based design or the non-Gaussian-based design. In some such implementations, because different MCS tables are used for different types of channels or different receiver types, the MCS tables may not have pairs of entries for which a spectral efficiency associated with an entry having a lower modulation order is higher than a spectral efficiency of an entry having a higher modulation order.

Figure 6:
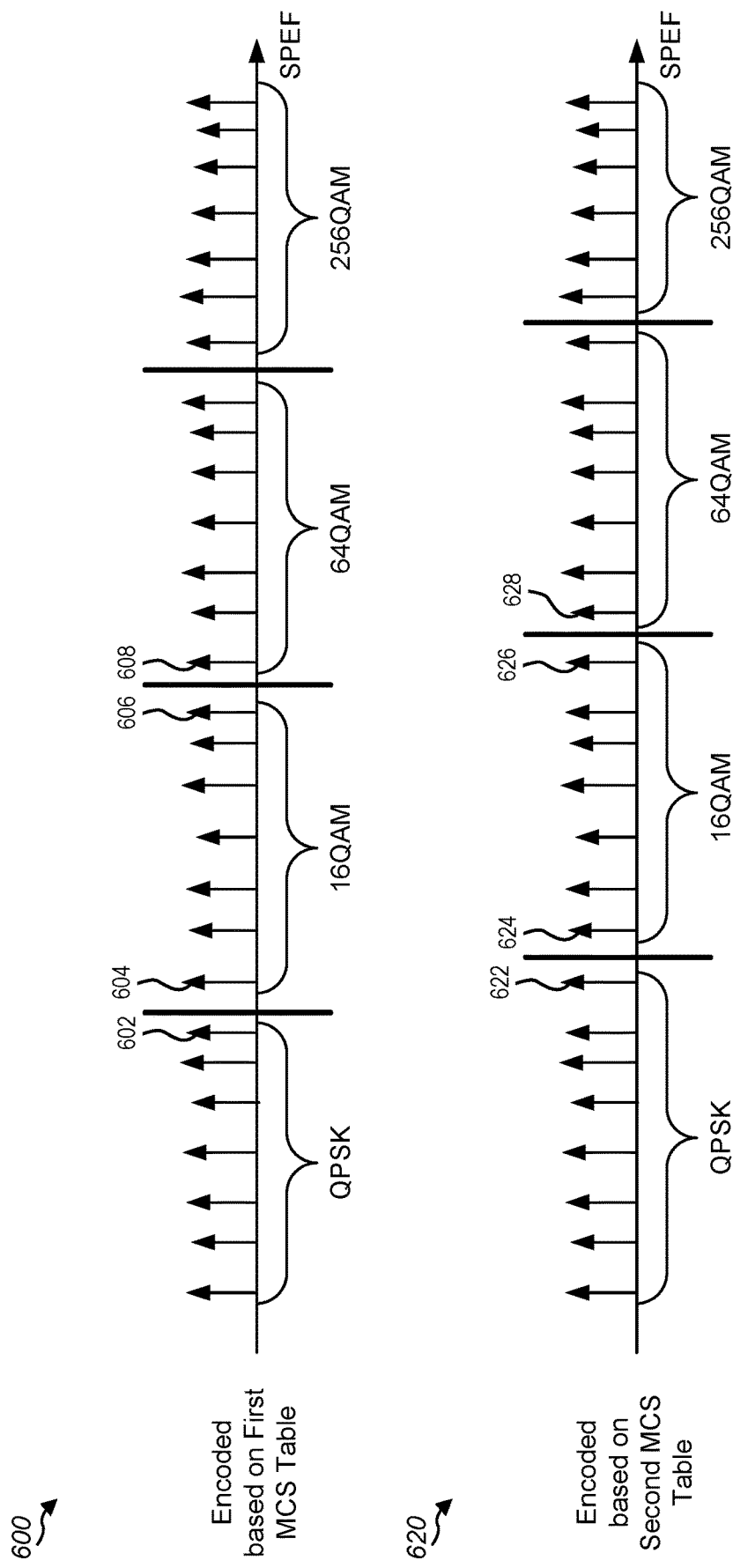
FIG. 6 shows spectral efficiencies of channel coding rates selected from multiple MCS tables according to one or more aspects.

FIG. 6 shows spectral efficiencies of channel coding rates selected from multiple MCS tables according to one or more aspects. The multiple MCS tables described with reference to FIG. 6 may correspond to a same maximum modulation order and a same waveform type and may be distinct in that the MCS tables are designed for different types of wireless channels (e.g., an AWGN channel or a non-Gaussian channel). Additionally or alternatively, different MCS tables may be designed for different UE receiver types, such as one or more MCS tables for non-linear receivers and one or more other MCS tables for linear receivers. In FIG. 6, an example of a first encoded signal 600 is encoded based on a first MCS table that is designed for Gaussian channels and an example of a second encoded signal 620 is encoded based on a second MCS table that is designed for non-Gaussian channels. For example, the first MCS table of FIG. 6 may include or correspond to second MCS table 412 and second MCS table 468 of FIG. 4, and the second MCS table of FIG. 6 may include or correspond to first MCS table 410 and first MCS table 466 of FIG. 4.

The MCS tables of FIG. 6 may be similar (e.g., may have a similar amount of entries that correspond to the same one or more modulation orders) except for entries on either side of transitions from one modulation order to another modulation order. For example, a first signal encoding 602 that corresponds to a last entry of the first MCS table that is associated with a first modulation order (e.g., QPSK) and a second signal encoding 604 that corresponds to a first entry of the first MCS table that is associated with a second modulation order (e.g., 16 QAM) may be different than a third signal encoding 622 that corresponds to a last entry of the second MCS table that is associated with the first modulation order and fourth signal encoding 624 that corresponds to a first entry of the second MCS table that is associated with the second modulation order, respectively. To illustrate, the third signal encoding 622, which corresponds to the first modulation order in the second MCS table, may have a substantially same or similar spectral efficiency as the second signal encoding 604, which corresponds to the second modulation order in the first MCS table. Replacing the entry corresponding to the second signal encoding 604 in the second MCS table with the entry corresponding to the third signal encoding 622 may result in signals encoded using the second MCS table having smoother throughput, particularly when transitioning from one modulation order to another modulation order, when communicated over a fading or MIMO channel. As such, FIG. 6 provides examples showing multiple MCS tables that correspond to the same maximum modulation order and waveform type, (e.g., CP-OFDM, DFT-S-OFDM, SC-QAM, etc.) that differ in the spectral efficiency of transition points between modulation orders. As a non-limiting example, the first MCS table and the second MCS table of FIG. 6 may correspond to a maximum modulation order of 256 QAM and to CP-OFDM waveforms. A wireless communication device may select between the multiple MCS tables based on communication parameters configured for wireless communications with other devices, channel measurements, receiver architectures at the wireless communication device, a selected probabilistic shaping rate, other parameters, or a combination thereof, that indicate whether a communication channel between devices is more likely to be an AWGN channel or a fading or MIMO channel (e.g., a non-Gaussian channel), as further described below.

Returning to FIG. 4, in implementations in which MCS data 408 represents multiple MCS tables that have the same maximum modulation order and correspond to the same waveform type, first wireless communication device 401 may select the MCS table to access within MCS data 408 based on instructions or information received from second wireless communication device 450, information generated by or known to first wireless communication device 401, or a combination thereof, to increase throughput and improve the smoothness of throughput changes when transitioning from encoding information 406 using a code having a first modulation order to using a code having a second modulation order. Operations are explained in more detail below. Second wireless communication device 450 may similarly select an MCS table from multiple MCS tables represented by MCS data 464 to access to select CCR 478 in a similar manner. Although MCS data 408 and MCS data 464 are illustrated in FIG. 4 as representing two MCS tables, in other implementations, MCS data 408 and MCS data 464 may represent a single MCS table or more than two MCS tables.

In some such implementations, first wireless communication device 401 may select the MCS table based on one or more instructions received from second wireless communication device 450. For example, first wireless communication device 401 may include or correspond to a UE, second wireless communication device 450 may include or correspond to a base station or other network entity, and second wireless communication device 450 (e.g., the base station) may select the MCS table based on one or more communication parameter values configured by second wireless communication device 450 for communications between first wireless communication device 401 and second wireless communication device 450. Although described below in the context of UE and base station and for DL or UL channels, in other implementations, first wireless communication device 401 and second wireless communication device 450 may both be UEs and the selection may be performed for use in wireless communications via one or more SL channels. The configured communication parameters may include a number of MIMO layers, fading channel characteristics, frequency ranges (FRs), or a combination thereof. In some implementations, second wireless communication device 450 may determine which MCS table to use based on a single parameter (e.g., one of the number of MIMO layers, the fading channel characteristics, or the FRs). In some other implementations, second wireless communication device 450 (e.g., the base station) may determine which MCS table to use based on two or more of configured communication parameters, alone or in combination with a recommendation from first wireless communication device 401 (e.g., the UE), as further described herein.

To illustrate, second wireless communication device 450 may select the MCS table based on the number of MIMO layers used in communications with first wireless communication device 401. As an example, if the number of MIMO layers configured for communications satisfies (e.g., is greater than or equal to) a threshold, second wireless communication device 450 may select first MCS table 466 that is designed based on non-Gaussian channels. Alternatively, if the number of MIMO layers fails to satisfy the threshold, second wireless communication device 450 may select second MCS table 468 is that is designed based on an AWGN channel. Such selection may occur because, as MIMO layers increase, interlayer interference increases and degrades performance of signals encoded based on an MCS table designed for an AWGN channel. In some implementations, because the number of MIMO layers is already communicated between the wireless communication devices, these communications implicitly indicate the MCS table to use (e.g., via the number of MIMO layers per PDSCH) and no additional signaling is needed between the wireless communication devices, as further described below.

Additionally or alternatively, second wireless communication device 450 may select the MCS table based on the fading channel characteristics of one or more communication channels with first wireless communication device 401. The fading channel characteristics may include a delay spread or doppler (which may determine the time selectivity and/or the frequency selectivity of a MIMO channel), a condition number or rank of a MIMO channel (which may determine the spatial separation between different MIMO layers and selectivity), other measurements that represent or indicate the time selectivity, frequency selectivity, or spatial selectivity of MIMO channels/layers, or a combination thereof. For example, second wireless communication device 450 may select first MCS table 466 that is based on the non-Gaussian channels when there is a larger delay spread or doppler, or a higher rank of a MIMO channel, to compensate for a lower selectivity due to these detected conditions.

Additionally or alternatively, second wireless communication device 450 may select the MCS table based on the FR(s) for which communications with first wireless communication device 401 are configured. To illustrate, different MCS tables may be used for different frequency ranges (FR1, FR2, FR3, FR4, sub-6 GHZ, 7-14 GHZ, mmWave, sub-THz, THz, etc.) because the channel characteristics, the number of MIMO layers used, or both, may be different between different FRs. To further illustrate, FR1 and FR3 may be more MIMO or massive MIMO (mMIMO) driven, thus MCS tables designed for MIMO may be used in these frequency ranges, while FR2 (mmWave) and FR4 (sub-THz) may be closer to an AWGN channel, and thus MCS tables that are designed for AWGN may be used in these frequency ranges. As an example, second wireless communication device 450 may select first MCS table 466 that is based on the non-Gaussian channels if communications are configured to be within FR1 or FR3. Alternatively, second wireless communication device 450 may select second MCS table 468 that is based on the AWGN if communications are configured to be within FR2 or FR4.

Once second wireless communication device 450 determines which MCS table to use, second wireless communication device 450 may provide explicit signaling to first wireless communication device 401 to instruct which MCS table is to be used. For example, second wireless communication device 450 may transmit MCS selection message 484 to first wireless communication device 401. MCS selection message 484 may include MCS table indicator 467, which indicates the selected MCS table (e.g., first MCS table 466 and, correspondingly, first MCS table 410). MCS selection message 484 may include or correspond to downlink control information (DCI), a medium access control (MAC) control element (MAC-CE), a radio resource (RRC) message, a radio network temporary identifier (RNTI) message, or another type of message. First wireless communication device 401 may receive MCS selection message 484 and select the MCS table (e.g., first MCS table 410 if that is the indicated MCS table) based on MCS table indicator 467.

Alternatively, second wireless communication device 450 may provide the selected MCS table to first wireless communication device 401 implicitly. To illustrate, second wireless communication device 450 (e.g., the base station) may configure communications according to communication parameter values 470 and select the MCS table to use based on communication parameter values 470. Additionally, communication parameter values 470 may be transmitted to first wireless communication device 401 as part of a configuration or association process, and one or more of communication parameter values 470 may indicate the MCS table to be used by first wireless communication device 401 for communicating with second wireless communication device 450. In some such implementations, communication parameter values 470 include a number of MIMO layers, a bandwidth part (BWP) index, a frequency range, a subcarrier spacing (SCS) value, a waveform type (e.g., one of DFT-S-OFDM, CP-OFDM, or SC-QAM), a grant parameter value, a bandwidth value, other parameter(s), or a combination thereof. For example, different MCS tables may be configured for different groups of MIMO layers (e.g., for layers that satisfy a threshold or layers that do not satisfy the threshold, or for individual layers). As another example, different MCS tables may be configured for different BWPs. As another example, different MCS tables may be configured for different frequency range(s) (e.g., one MCS table for FR1 and FR3, another MCS table for FR2 and FR4). As another example, different MCS tables may be configured for different SCS values (e.g., one MCS table for 15 kHz SCS, another MCS table for 30 KHz SCS). As another example, different MCS tables may be configured for different waveform types, such as DFT-S-OFDM, CP-OFDM, SC-QAM, or the like. As another example, different MCS tables may be configured for different parameters associated with the DL/UL/SL grants or for different bandwidths. First wireless communication device 401 may receive communication parameter values 470 and select CCR 422 based on communication parameter values 470. For example, first wireless communication device 401 may access the MCS table that corresponds to one or more of the particular values indicated by communication parameter values 470.

In some implementations in which MCS data 408 and MCS data 464 represent multiple MCS tables, first wireless communication device 401 may perform channel measurements as part of the MCS table selection process. To illustrate, first wireless communication device 401 may measure one or more conditions of one or more communication channels (e.g., a UL channel, a DL channel, a SL channel, etc.) between first wireless communication device 401 and second wireless communication device 450 to generate channel measurement data 414. In some such implementations, first wireless communication device 401 selects the MCS table based on channel measurement data 414 as measured channel conditions may be associated with different MCS tables depending on the measured values, similar to as described above for the configured communication parameters at the base station (e.g., second wireless communication device 450) or communication parameter values 470. For example, first wireless communication device 401 may measure the DL channel based on a channel state indicator reference signal (CSI-RS) or a demodulation reference signal (DMRS) received via previous PDSCH transmissions, and first wireless communication device 401 may check its receiver algorithm(s) to recommend a MCS table to use to communicate with second wireless communication device 450. Responsive to selecting the MCS table (e.g., first MCS table 410), first wireless communication device 401 may transmit MCS recommendation message 482 to second wireless communication device 450, with MCS recommendation message 482 including MCS table indicator 411 that indicates the selected MCS table (e.g., first MCS table 410, in this example). MCS recommendation message 482 may include or correspond to a scheduling request (SR), a acknowledge/negative acknowledge (ACK/NACK) report, a channel quality indicator/channel state indicator (CQI/CSI) report, a MAC-CE, a RRC message, UE capability signaling, or another type of message. Second wireless communication device 450 may receive MCS recommendation message 482 and select first MCS table 466 based on MCS table indicator 411 for use in encoding and decoding communications with first wireless communication device 401. Alternatively, instead of including MCS table indicator 411, MCS recommendation message 482 may include channel measurement data 414, and second wireless communication device 450 may check its receiver algorithm(s) to recommend a MCS table to use to communicate with first wireless communication device 401 based on the measurements. Second wireless communication device 450 may select the MCS table based on UE recommendation (e.g., MCS recommendation message 482) alone, or in combination with one or more of the configured communication parameters, as described above. In such implementations, second wireless communication device 450 may communicate the selected MCS table to first wireless communication device 401 explicitly (e.g., via MCS selection message 484) or implicitly (e.g., via communication parameter values 470).

In some implementations in which MCS data 408 and MCS data 464 represent multiple MCS tables, first wireless communication device 401 may recommend a MCS table (in a semi-static fashion) based on a receiver architecture at first wireless communication device 401. For example, if receiver 426 is a non-linear MIMO receiver, first wireless communication device 401 may select first MCS table 410 that is designed for non-Gaussian channels. Alternatively, if receiver 426 is a linear MIMO receiver, first wireless communication device 401 may select second MCS table 412 that is designed for a AWGN channel. Stated another way, first MCS table 410 may be more suitable for a non-linear MIMO receiver, and second MCS table 412 may be more suitable for a linear MIMO receiver. After selecting the MCS table, first wireless communication device 401 may provide MCS recommendation message 482 that includes MCS table indicator 411 to second wireless communication device 450. As described above, MCS recommendation message 482 may include or correspond to a SR, an ACK/NACK report, a CQI/CSI report, a MAC-CE, a RRC message, UE capability signaling, or another type of message. Second wireless communication device 450 may receive MCS recommendation message 482 and may select the corresponding MCS table indicated by MCS table indicator 411 included in MCS recommendation message 482. As described above, second wireless communication device 450 may select the MCS table entirely based on MCS recommendation message 482 or based on MCS recommendation message 482 in combination with one or more configured communication parameters.

In some implementations, the entries of the MCS tables represented by MCS data 408 and MCS data 464 also include corresponding probabilistic shaping rates in addition to modulation orders and coding rates. Probabilistic shaping is a technique to make the distribution of modulated symbols (e.g., QAM symbols) non-uniformly distributed, which is able to achieve shaping gain. For MCS with probabilistic shaping, the shaping distribution may be indicated or based on one or more shaping parameters selected from: shaping probability, source entropy, a scaling parameter in a Maxwell-Boltzman distribution, and the shaping rate, (i.e., the ratio between the number of information bits prior to shaping and the number of information bits after the shaping). The spectral efficiency of a probabilistically-shaped system may be determined jointly based on modulation order, channel code rate, and shaping rate. To illustrate, the shaping rate may be determined using Equation 1 below, the channel code rate may be determined using Equation 2 below, and the spectral efficiency may be determined using Equation 3 below, where K is the number information bits, N is the total number of coded bits (e.g., N=number of layers*m*number of data resource elements), m is the modulation order, $M_1$ is the number of shaped information bits, and $M_2$ is the number of unshaped information bits.

Shaping Rate $$R_{shaping} = \frac{K}{M_1 + M_2} \quad \text{Equation 1}$$

Channel Code Rate $$R_{FEC} = \frac{M_1 + M_2}{N} \quad \text{Equation 2}$$

Spectral Efficiency $$Spef = R_{shaping} \cdot R_{FEC} \quad \text{Equation 3}$$

In some such implementations, the MCS tables may include multiple entries with the same modulation order and channel coding rate but with different probabilistic shaping rates. To illustrate, in a group of MCS table entries having the same modulation order, there may be one or more sets of entries, where entries within the same set share the same CCR but have different probabilistic shaping rates, and entries across different sets have different CCRs. Additionally or alternatively, there may be different entries that are associated with the same spectral efficiency but with different modulation orders, different CCRs, different probabilistic shaping rates, or a combination thereof. For example, for a same modulation order, there may be two entries that are associated with the same spectral efficiency but have different combinations of probabilistic shaping rates and CCRs.

A partial example of such an MCS table is provided by Table 4 below. As can be seen from Table 4, each entry includes a corresponding probabilistic shaping rate value, and the spectral efficiency associated with an entry may be the same or less than the spectral efficiency associated with a previous entry.

TABLE 4

Example of Partial MCS Table with Shaping Rate

| MCS Index | Modulation Order | Target CCR | Shaping Rate | Spectral Efficiency |
|---|---|---|---|---|
| K − 1 | 64 QAM | 983/1024 | 1 | 5.76 |
| K | 256 QAM | 737.3/1024 | 1 | 5.76 |
| K + 1 | 256 QAM | 819.2/1024 | 921.6/1024 | 5.76 |
| K + 2 | 256 QAM | 819.2/1024 | 1 | 6.4 |
| K + 3 | 256 QAM | 921.6/1024 | 819.2/1024 | 5.76 |
| K + 4 | 256 QAM | 921.6/1024 | 910.2/1024 | 6.4 |

In implementations in which MCS data 408 and MCS data 464 include probabilistic shaping rates, CCRs may be selected based further on target probabilistic shaping rates. For example, first wireless communication device 401 may select CCR 422 from the selected MCS table based on modulation order 418 and shaping rate 420 (e.g., a probabilistic shaping rate). Similarly, second wireless communication device 450 may select CCR 478 from a selected MCS table based on modulation order 474 and shaping rate 476 (e.g., a probabilistic shaping rate). In some other implementations, entries in the MCS tables do not include probabilistic shaping rates, and instead different MCS tables are configured for different probabilistic shaping rates, or one set of MCS tables is configured for probabilistic shaping being enabled, and another set of MCS tables is configured for probabilistic shaping being disabled. In such implementations, the MCS table may be selected based on the target probabilistic shaping rate or whether probabilistic shaping is enabled (or disabled). For example, first wireless communication device 401 may select from first MCS table 410 and second MCS table 412 (and any other MCS tables represented by MCS data 408) based on shaping rate 420, or based on whether shaping rate 420 indicates that probabilistic shaping is enabled (or disabled). Similarly, second wireless communication device 450 may select from first MCS table 466 and second MCS table 468 (and any other MCS tables represented by MCS data 464) based on shaping rate 476, or based on whether shaping rate 476 indicates that probabilistic shaping is enabled (or disabled).

As described with reference to FIG. 4, the present disclosure provides techniques for supporting MCS table design for non-Gaussian channels. The techniques described provide MCS tables (e.g., represented by MCS data 408 and MCS data 464) that provide improved throughput for wireless communications via fading or MIMO channels that differ from an AWGN channel, particularly at transition points between different modulation orders. For example, a MCS table may be designed such that at least one pair of consecutive entries are associated with spectral efficiencies that are the same or that decrease with respect to index value. Such entries may result in smoother throughput changes and increased throughput when first wireless communication device 401 adaptively changes modulation order 418 and CCR 422 to perform wireless communications with second wireless communication device 450 via a fading or MIMO channel. Similarly, such entries may result in smoother throughput changes and increased throughput when second wireless communication device 450 adaptively changes modulation order 474 and CCR 478 to perform wireless communications with first wireless communication device 401 via a fading or MIMO channel. Additionally, the MCS table design described with reference to FIG. 4 enables use of higher coding rates for lower modulation orders at transition points between different modulation orders, as shown in the examples of Tables 2-4, which reduces the decoding and demodulation complexity at these transition points. Such a reduction in decoding and demodulation complexity may enable reduced power consumption at decoding devices.

Figure 7:
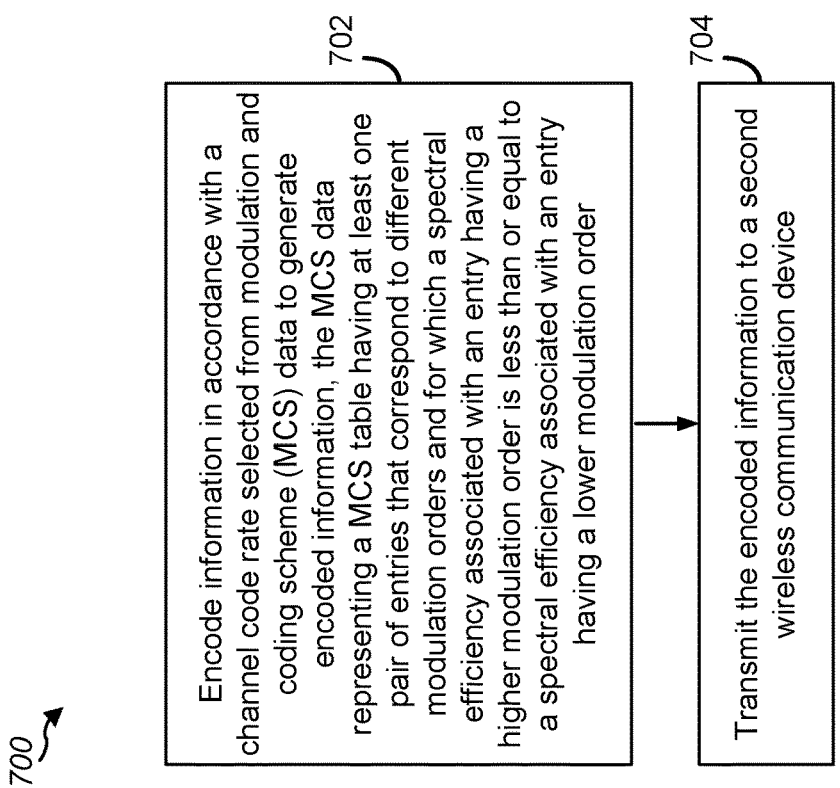
FIG. 7 is a flow diagram illustrating an example process that supports MCS table design for non-Gaussian channels according to one or more aspects.

FIG. 7 is a flow diagram illustrating an example process 700 that supports MCS table design for non-Gaussian channels according to one or more aspects. Operations of process 700 may be performed by a wireless communication device, such as UE 115 described above with reference to FIGS. 1-3 or a UE described with reference to FIG. 8, or first wireless communication device 401 described with reference to FIG. 4. For example, example operations (also referred to as "blocks") of process 700 may enable UE 115 or first wireless communication device 401 to support MCS table design for non-Gaussian channels.

In block 702, the wireless communication device encodes information in accordance with a channel code rate selected from MCS data to generate encoded information. For example, the information may include or correspond to information 406 of FIG. 4, the channel code rate may include or correspond to CCR 422 of FIG. 4, and the MCS data may include or correspond to MCS data 408 of FIG. 4. The MCS data represents a MCS table having at least one pair of entries that correspond to different modulation orders and for which a spectral efficiency associated with an entry having a higher modulation order is less than or equal to a spectral efficiency associated with an entry having a lower modulation order.

In block 704, the wireless communication device transmits the encoded information to a second wireless communication device. For example, the encoded information may include or correspond to encoded information 480 of FIG. 4.

In some implementations, a first entry of a first pair of entries of the MCS table includes a first modulation order and is associated with a first spectral efficiency, a second entry of the first pair of entries includes a second modulation order that is greater than the first modulation order, the second entry is associated with a second spectral efficiency that is the same as the first spectral efficiency, and either the first entry or the second entry includes the channel code rate. For example, the first pair of entries may include or correspond to entries in Table 3. In some other implementations, a first entry of a first pair of entries of the MCS table includes a first modulation order and is associated with a first spectral efficiency, a second entry of the first pair of entries includes a second modulation order that is greater than the first modulation order, the second entry is associated with a second spectral efficiency that is less than the first spectral efficiency, and either the first entry or the second entry includes the channel code rate. For example, the first pair of consecutively indexed entries may include or correspond to entries in Table 2.

In some implementations, the entry having the lower modulation order may have a first index value, and the entry having the higher modulation order may have a second index value that is greater than the first modulation value, as shown in Tables 2-4. In some such implementations, the at least one pair of entries include consecutively indexed entries.

In some implementations, process 700 further includes receiving second encoded information from the second wireless communication device and decoding the second encoded information in accordance with the coding rate selected from the MCS data to generate received information. For example, the second encoded information may include or correspond to encoded information 488 of FIG. 4.

Figure 8:
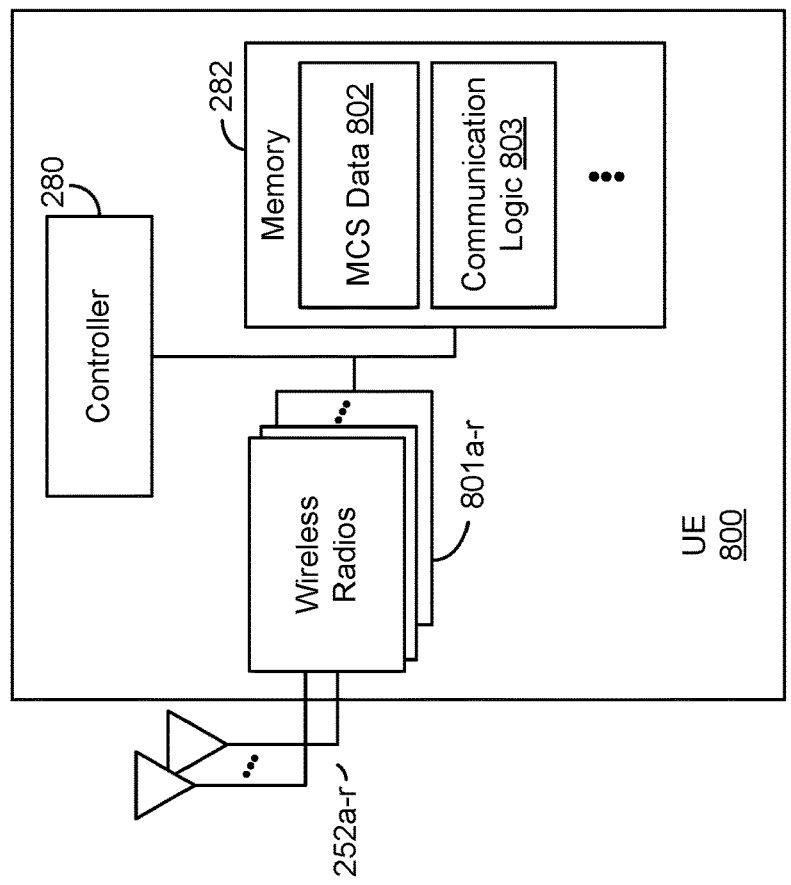
FIG. 8 is a block diagram of an example UE that supports MCS table design for non-Gaussian channels according to one or more aspects.

FIG. 8 is a block diagram of an example UE 800 that supports MCS table design for non-Gaussian channels according to one or more aspects. UE 800 may be configured to perform operations, including the blocks of a process described with reference to FIG. 7. In some implementations, UE 800 includes the structure, hardware, and components shown and described with reference to UE 115 of FIGS. 1-3 or first wireless communication device 401 of FIG. 4. For example, UE 800 includes controller 280, which operates to execute logic or computer instructions stored in memory 282, as well as controlling the components of UE 800 that provide the features and functionality of UE 800. UE 800, under control of controller 280, transmits and receives signals via wireless radios 801a-r and antennas 252a-r. Wireless radios 801a-r include various components and hardware, as illustrated in FIG. 2 for UE 115, including modulator and demodulators 254a-r, MIMO detector 256, receive processor 258, transmit processor 264, and TX MIMO processor 266.

As shown, memory 282 may include MCS data 802 and communication logic 803. MCS data 802 may include or correspond to MCS data 408 of FIG. 4. Communication logic 803 may be configured to enable communication between UE 800 and one or more other devices. UE 800 may receive signals from or transmit signals to one or more network entities, such as base station 105 of FIGS. 1-3 or a base station as illustrated in FIG. 10, or second wireless communication device 450 of FIG. 4.

FIG. 9 is a flow diagram illustrating an example process 900 that supports MCS table design for non-Gaussian channels according to one or more aspects. Operations of process 900 may be performed by a wireless communication device, such as base station 105 described above with reference to FIGS. 1-3 or a base station as described above with reference to FIG. 10, or second wireless communication device 450 described above with reference to FIG. 4. For example, example operations of process 900 may enable base station 105 or second wireless communication device 450 to support MCS table design for non-Gaussian channels.

At block 902, the wireless communication device encodes information in accordance with a channel code rate selected from MCS data to generate encoded information. For example, the information may include or correspond to information 462 of FIG. 4, the channel code rate may include or correspond to CCR 478 of FIG. 4, and the MCS data may include or correspond to MCS data 464 of FIG. 4. The MCS data represents a MCS table having at least one pair of entries that correspond to different modulation orders and for which a spectral efficiency associated with an entry having a higher modulation order is less than or equal to a spectral efficiency associated with an entry having a lower modulation order.

At block 904, the wireless communication device transmits the encoded information to a second wireless communication device. For example, the encoded information may include or correspond to encoded information 488 of FIG. 4.

In some implementations, process 900 further includes receiving second encoded information from the second wireless communication device and decoding the second encoded information in accordance with the coding rate selected from the MCS data to generate received information. For example, the second encoded information may include or correspond to encoded information 480 of FIG. 4.

FIG. 10 is a block diagram of an example base station 1000 that supports MCS table design for non-Gaussian channels according to one or more aspects. Base station 1000 may be configured to perform operations, including the blocks of process 900 described with reference to FIG. 9. In some implementations, base station 1000 includes the structure, hardware, and components shown and described with reference to base station 105 of FIGS. 1-3 or second wireless communication device 450 of FIG. 4. For example, base station 1000 may include controller 240, which operates to execute logic or computer instructions stored in memory 242, as well as controlling the components of base station 1000 that provide the features and functionality of base station 1000. Base station 1000, under control of controller 240, transmits and receives signals via wireless radios 1001a-t and antennas 234a-t. Wireless radios 1001a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include MCS data 1002 and communication logic 1003. MCS data 1002 may include or correspond to MCS data 464 of FIG. 4. Communication logic 1003 may be configured to enable communication between base station 1000 and one or more other devices. Base station 1000 may receive signals from or transmit signals to one or more UEs, such as UE 115 of FIGS. 1-3 or UE 800 of FIG. 8, or first wireless communication device 401 of FIG. 4.

FIG. 11 is a flow diagram illustrating an example process 1100 that supports MCS table design for non-Gaussian channels according to one or more aspects. Operations of process 1100 may be performed by a wireless communication device, such as UE 115 described above with reference to FIGS. 1-3 or UE 800 described with reference to FIG. 8, or first wireless communication device 401 described with reference to FIG. 4. For example, example operations (also referred to as "blocks") of process 1100 may enable UE 115, UE 800, or first wireless communication device 401 to support MCS table design for non-Gaussian channels.

In block 1102, the wireless communication device encodes information in accordance with a channel code rate selected from a MCS table selected from a plurality of MCS tables represented by MCS data to generate encoded information. For example, the information may include or correspond to information 406 of FIG. 4, the channel code rate may include or correspond to CCR 422 of FIG. 4, the MCS data may include or correspond to MCS data 408 of FIG. 4, and the plurality of MCS tables may include or correspond to the first MCS table 410 and the second MCS table 412 of FIG. 4. The plurality of MCS tables correspond to a same maximum modulation order and a same waveform type.

In block 1104, the wireless communication device transmits the encoded information to a second wireless communication device. For example, the encoded information may include or correspond to encoded information 480 of FIG. 4.

In some implementations, at least one MCS table of the plurality of MCS tables is designed based on an AWGN channel and at least another MCS table of the plurality of MCS tables is designed based on MIMO channels. For example, first MCS table 410 of FIG. 4 may be designed to be suitable for communication over fading or MIMO channels, and second MCS table 412 of FIG. 4 may be designed to be suitable for communication over an AWGN channel.

In some implementations, process 1100 also includes receiving a MCS selection message from the second wireless communication device. The MCS selection message indicates the MCS table. For example, the MCS selection message may include or correspond to MCS selection message 484 of FIG. 4 that includes MCS table indicator 467. In some such implementations, the MCS selection message includes or corresponds to DCI, a MAC-CE, or a RRC message.

In some implementations, process 1100 also includes receiving one or more communication parameter values from the second wireless communication device. The MCS table is selected from the plurality of MCS tables based on the one or more communication parameter values. For example, the one or more communication parameter values may include or correspond to communication parameter values 470 of FIG. 4. In some such implementations, the one or more communication parameter values include a number of MIMO layers, a BWP index, a frequency range, a SCS value, a waveform type, a grant parameter value, a bandwidth value, a rank, or a combination thereof. The waveform type may be one of DFT-S-OFDM, CP-OFDM, or SC-QAM.

In some implementations, process 1100 also includes performing one or more channel measurements on a wireless communication channel with the second wireless communication device and selecting the MCS table from the plurality of MCS tables based on the one or more channel measurements. For example, the one or more channel measurements may include or correspond to channel measurement data 414 of FIG. 4. In some such implementations, process 1100 further includes transmitting a MCS recommendation message to the second wireless communication device. The MCS recommendation message indicates the MCS table. For example, the MCS recommendation message may include or correspond to MCS recommendation message 482 of FIG. 4. The MCS recommendation message may include or correspond to a SR, an ACK/NACK report, a CQI/CSI report, a MAC-CE, a RRC message, or UE capability signaling.

In some implementations, process 1100 also includes selecting the MCS table from the plurality of MCS tables based on a receiver architecture of a receiver of the wireless communication device. For example, the receiver architecture may include or correspond to an architecture of receiver 426 of FIG. 4.

In some implementations, the channel code rate is selected from the MCS table based on a probabilistic shaping rate, the MCS table is selected from the plurality of MCS tables based on the probabilistic shaping rate, or both. For example, the probabilistic shaping rate may include or correspond to shaping rate 420 of FIG. 4. Additionally or alternatively, process 1100 may further include receiving a MCS configuration message from the second wireless communication device. The MCS configuration message includes the MCS data. For example, the MCS configuration message may include or correspond to MCS configuration message 486 that includes MCS data 464.

FIG. 12 is a flow diagram illustrating an example process 1200 that supports MCS table design for non-Gaussian channels according to one or more aspects. Operations of process 1200 may be performed by a wireless communication device, such as base station 105 described above with reference to FIGS. 1-3 or base station 1000 as described above with reference to FIG. 10, or second wireless communication device 450 described above with reference to FIG. 4. For example, example operations of process 1200 may enable base station 105, base station 1000, or second wireless communication device 450 to support MCS table design for non-Gaussian channels.

At block 1202, the wireless communication device encodes information in accordance with a channel code rate selected from a MCS table selected from a plurality of MCS tables represented by MCS data to generate encoded information. For example, the information may include or correspond to information 462 of FIG. 4, the channel code rate may include or correspond to CCR 478 of FIG. 4, the MCS data may include or correspond to MCS data 464 of FIG. 4, and the plurality of MCS tables may include or correspond to the first MCS table 466 and the second MCS table 468 of FIG. 4. The plurality of MCS tables correspond to a same maximum modulation order and a same waveform type.

At block 1204, the wireless communication device transmits the encoded information to a second wireless communication device. For example, the encoded information may include or correspond to encoded information 488 of FIG. 4.

In some implementations, process 1200 also includes transmitting a MCS selection message to the second wireless communication device. The MCS selection message indicates the MCS table. For example, the MCS selection message may include or correspond to MCS selection message 484 of FIG. 4 that includes MCS table indicator 467. In some such implementations, the MCS selection message includes or corresponds to DCI, a MAC-CE, or a RRC message.

In some implementations, process 1200 also includes configuring wireless communications with the second wireless communication device according to one or more communication parameter values and selecting the MCS table from the plurality of MCS tables based on the one or more communication parameter values. For example, the one or more communication parameter values may include or correspond to communication parameter values 470 of FIG. 4. In some such implementations, the one or more communication parameter values include a number of MIMO layers, a BWP index, a frequency range, a SCS value, a waveform type, a grant parameter value, a bandwidth value, a rank, or a combination thereof. The waveform type may be one of DFT-S-OFDM, CP-OFDM, or SC-QAM. In some such implementations, process 1200 may further include transmitting the one or more communication parameter values to the second wireless communication device to indicate the MCS table. For example, second wireless communication device 450 of FIG. 4 may transmit communication parameter values 470 to first wireless communication device 401.

In some implementations, process 1200 also includes receiving a MCS recommendation message from the second wireless communication device and selecting the MCS table from the plurality of MCS tables based on receipt of the MCS recommendation message. The MCS recommendation message indicates the MCS table. For example, the MCS recommendation message may include or correspond to MCS recommendation message 482 of FIG. 4. The MCS recommendation message may include or correspond to a SR, an ACK/NACK report, a CQI/CSI report, a MAC-CE, a RRC message, or UE capability signaling.

In some implementations, the channel code rate is selected from the MCS table based on a probabilistic shaping rate, the MCS table is selected from the plurality of MCS tables based on the probabilistic shaping rate, or both. For example, the probabilistic shaping rate may include or correspond to shaping rate 476 of FIG. 4. Additionally or alternatively, process 1200 may further include transmitting a MCS configuration message to the second wireless communication device. The MCS configuration message includes the MCS data. For example, the MCS configuration message may include or correspond to MCS configuration message 486 that includes MCS data 464.

It is noted that one or more blocks (or operations) described with reference to FIGS. 7, 9, 11, and 12 may be combined with one or more blocks (or operations) described with reference to another of the figures. For example, one or more blocks (or operations) of FIG. 7 may be combined with one or more blocks (or operations) of FIG. 11. As another example, one or more blocks associated with FIG. 9 may be combined with one or more blocks associated with FIG. 12. As another example, one or more blocks associated with FIG. 7, 9, 11, or 12 may be combined with one or more blocks (or operations) associated with FIGS. 1-4. Additionally, or alternatively, one or more operations described above with reference to FIGS. 1-4 may be combined with one or more operations described with reference to FIG. 8 or 10.

In one or more aspects, techniques for supporting MCS table design for non-Gaussian channels may include additional aspects, such as any single aspect or any combination of aspects described below or in connection with one or more other processes or devices described elsewhere herein. In a first aspect, techniques for supporting MCS table design for non-Gaussian channels may include encoding information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The techniques may further include transmitting the encoded information to a second wireless communication device. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein. In some other implementations, wireless communication device may include a network entity, such as a base station, or a component of a network entity.

In a second aspect, in combination with the first aspect, a first entry of a first pair of entries of the MCS table includes a first modulation order and is associated with a first spectral efficiency. A second entry of the first pair of entries includes a second modulation order that is greater than the first modulation order. The second entry is associated with a second spectral efficiency that is the same as the first spectral efficiency. Either the first entry or the second entry includes the channel code rate.

In a third aspect, in combination with the first aspect or the second aspect, a first entry of a first pair of entries of the MCS table includes a first modulation order and is associated with a first spectral efficiency. A second entry of the first pair of entries includes a second modulation order that is greater than the first modulation order. The second entry is associated with a second spectral efficiency that is less than the first spectral efficiency. Either the first entry or the second entry includes the channel code rate.

In a fourth aspect, in combination with one or more of the first aspect through the third aspect, the techniques include receiving second encoded information from the second wireless communication device and decoding the second encoded information in accordance with the coding rate selected from the MCS data to generate received information.

In a fifth aspect in combination with one or more of the first aspect through the fourth aspect, the entry having the lower modulation order has a first index value and the entry having the higher modulation order has a second index value that is greater than the first index value.

In a sixth aspect, in combination with one or more of the first aspect through the fifth aspect, the wireless communication device includes or corresponds to a UE and the second wireless communication device includes or corresponds to a network entity that communicates with the UE via at least a DL channel and a UL channel.

In a seventh aspect, in combination with one or more of the first aspect through the fifth aspect, the wireless communication device includes or corresponds to a first UE and the second wireless communication device includes or corresponds to a second UE that communicates with the first UE via one or more SL channels.

In one or more aspects, techniques for supporting MCS table design for non-Gaussian channels may include additional aspects, such as any single aspect or any combination of aspects described below or in connection with one or more other processes or devices described elsewhere herein. In an eighth aspect, techniques for supporting MCS table design for non-Gaussian channels may include encoding information in accordance with a channel code rate selected from MCS data to generate encoded information. The MCS data represents a MCS table having at least one pair of entries that correspond to different modulation orders and for which a spectral efficiency associated with an entry having a higher modulation order is less than or equal to a spectral efficiency associated with an entry having a lower modulation order. The techniques may further include transmitting the encoded information to a second wireless communication device. In some examples, the techniques in the eighth aspect may be implemented in a method or process. In some other examples, the techniques of the eighth aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein. In some other implementations, the wireless communication device may include a UE or a component of a UE.

In a ninth aspect, in combination with the eighth aspect, a first entry of a first pair of entries of the MCS table includes a first modulation order and is associated with a first spectral efficiency. A second entry of the first pair of entries includes a second modulation order that is greater than the first modulation order. The second entry is associated with a second spectral efficiency that is the same as the first spectral efficiency. Either the first entry or the second entry includes the channel code rate.

In a tenth aspect, in combination with the eighth aspect or the ninth aspect, a first entry of a first pair of entries of the MCS table includes a first modulation order and is associated with a first spectral efficiency. A second entry of the first pair of entries includes a second modulation order that is greater than the first modulation order. The second entry is associated with a second spectral efficiency that is less than the first spectral efficiency. Either the first entry or the second entry includes the channel code rate.

In an eleventh aspect, in combination with one or more of the eighth aspect through the tenth aspect, the techniques include receiving second encoded information from the second wireless communication device and decoding the second encoded information in accordance with the coding rate selected from the MCS data to generate received information.

In a twelfth aspect in combination with one or more of the eighth aspect through the eleventh aspect, the entry having the lower modulation order has a first index value and the entry having the higher modulation order has a second index value that is greater than the first index value.

In a thirteenth aspect, in combination with one or more of the eighth aspect through the twelfth aspect, the second wireless communication device includes or corresponds to a UE and the wireless communication device includes or corresponds to a network entity that communicates with the UE via at least a DL channel and a UL channel.

In a fourteenth aspect, in combination with one or more of the eighth aspect through the twelfth aspect, the wireless communication device includes or corresponds to a first UE and the second wireless communication device includes or corresponds to a second UE that communicates with the first UE via one or more SL channels.

In one or more aspects, techniques for supporting MCS table design for non-Gaussian channels may include additional aspects, such as any single aspect or any combination of aspects described below or in connection with one or more other processes or devices described elsewhere herein. In a fifteenth aspect, techniques for supporting MCS table design for non-Gaussian channels may include encoding information in accordance with a channel code rate selected from a MCS table selected from a plurality of MCS tables represented by MCS data to generate encoded information. The plurality of MCS tables correspond to a same maximum modulation order and a same waveform type. The techniques may further include transmitting the encoded information to a second wireless communication device. In some examples, the techniques in the fifteenth aspect may be implemented in a method or process. In some other examples, the techniques of the fifteenth aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein. In some other implementations, wireless communication device may include a network entity, such as a base station, or a component of a network entity.

In a sixteenth aspect, in combination with the fifteenth aspect, at least one MCS table of the plurality of MCS tables is designed based on an AWGN channel. At least another MCS table of the plurality of MCS tables is designed based on MIMO channels.

In a seventeenth aspect, in combination with the fifteenth aspect or the sixteenth aspect, the techniques further include receiving a MCS selection message from the second wireless communication device. The MCS selection message indicates the MCS table.

In an eighteenth aspect, in combination with the seventeenth aspect, the MCS selection message includes DCI, a MAC-CE, or a RRC message.

In a nineteenth aspect, in combination with one or more of the fifteenth aspect through the sixteenth aspect, the techniques further include receiving one or more communication parameter values from the second wireless communication device. The MCS table is selected from the plurality of MCS tables based on the one or more communication parameter values.

In a twentieth aspect, in combination with the nineteenth aspect, the one or more communication parameter values include a number of MIMO layers, a BWP index, a frequency range, a SCS value, a waveform type, a grant parameter value, a bandwidth value, a rank, or a combination thereof.

In a twenty-first aspect, in combination with the twentieth aspect, the waveform type is one of DFT-S-OFDM, CP-OFDM, or SC-QAM.

In a twenty-second aspect, in combination with one or more of the fifteenth aspect through the twenty-first aspect, the channel code rate is selected from the MCS table based on a probabilistic shaping rate, the MCS table is selected from the plurality of MCS tables based on the probabilistic shaping rate, or both.

In a twenty-third aspect, in combination with one or more of the fifteenth aspect through the twenty-second aspect, the techniques further include transmitting a MCS selection message to the second wireless communication device. The MCS selection message indicates the MCS table.

In a twenty-fourth aspect, in combination with the twenty-third aspect, the MCS selection message includes DCI, a MAC-CE, or a RRC message.

In a twenty-fifth aspect, in combination with one or more of the fifteenth aspect through the twenty-fourth aspect, the wireless communication device includes or corresponds to a network entity. The second wireless communication device includes or corresponds to a UE that communicates with the network entity via at least a DL channel and a UL channel.

In a twenty-sixth aspect, in combination with one or more of the fifteenth aspect through the twenty-fourth aspect, the wireless communication device includes or corresponds to a first UE. The second wireless communication device includes or corresponds to a second UE that communicates with the first UE via one or more SL channels.

In a twenty-seventh aspect, in combination with one or more of the fifteenth aspect through the twenty-sixth aspect, the techniques further include performing one or more channel measurements on a wireless communication channel with the second wireless communication device and selecting the MCS table from the plurality of MCS tables based on the one or more channel measurements.

In a twenty-eighth aspect, in combination with the twenty-seventh aspect, the techniques further include initiating transmission of a MCS recommendation message to the second wireless communication device. The MCS recommendation message indicates the MCS table.

In a twenty-ninth aspect, in combination with the twenty-eighth aspect, the MCS recommendation message includes a SR, an ACK/NACK report, a CQI/CSI report, a MAC-CE, a RRC message, or UE capability signaling.

In a thirtieth aspect, in combination with one or more of the fifteenth aspect through the twenty-ninth aspect, the techniques further include selecting the MCS table from the plurality of MCS tables based on a receiver architecture of a receiver of the wireless communication device.

In a thirty-first aspect, in combination with one or more of the fifteenth aspect through the thirtieth aspect, the techniques further include receiving a MCS configuration message from the second wireless communication device. The MCS configuration message includes the MCS data.

In a thirty-second aspect, in combination with one or more of the fifteenth aspect through the thirty-first aspect, the techniques further include configuring wireless communications with the second wireless communication device according to one or more communication parameter values and selecting the MCS table from the plurality of MCS tables based on the one or more communication parameter values.

In a thirty-third aspect, in combination with the thirty-second aspect, the one or more communication parameter values include a number of MIMO layers, a BWP index, a frequency range, a SCS value, a waveform type, a grant parameter value, a bandwidth value, a rank, or a combination thereof.

In a thirty-fourth aspect, in combination with one or more of the thirty-second aspect through the thirty-third aspect, the techniques further include initiating transmission of the one or more communication parameter values to the second wireless communication device to indicate the MCS table.

In a thirty-fifth aspect, in combination with one or more of the fifteenth aspect through the thirty-fourth aspect, the techniques further include receiving a MCS recommendation message from the second wireless communication device. The MCS recommendation message indicates the MCS table. The techniques also include selecting the MCS table from the plurality of MCS tables based on receipt of the MCS recommendation message.

In one or more aspects, techniques for supporting MCS table design for non-Gaussian channels may include additional aspects, such as any single aspect or any combination of aspects described below or in connection with one or more other processes or devices described elsewhere herein. In a thirty-sixth aspect, techniques for supporting MCS table design for non-Gaussian channels may include encoding information in accordance with a channel code rate selected from a MCS table selected from a plurality of MCS tables represented by MCS data to generate encoded information. The plurality of MCS tables correspond to a same maximum modulation order and a same waveform type. The techniques may further include transmitting the encoded information to a second wireless communication device. In some examples, the techniques in the thirty-sixth aspect may be implemented in a method or process. In some other examples, the techniques of the thirty-sixth aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein. In some other implementations, the wireless communication device may include a UE or a component of a UE.

In a thirty-seventh aspect, in combination with the thirty-sixth aspect, at least one MCS table of the plurality of MCS tables is designed based on an AWGN channel. At least another MCS table of the plurality of MCS tables is designed based on MIMO channels.

In a thirty-eighth aspect, in combination with the thirty-sixth aspect or the thirty-seventh aspect, the techniques further include receiving a MCS selection message from the second wireless communication device. The MCS selection message indicates the MCS table.

In a thirty-ninth aspect, in combination with the thirty-eighth aspect, the MCS selection message includes DCI, a MAC-CE, or a RRC message.

In a fortieth aspect, in combination with one or more of the thirty-sixth aspect through the thirty-seventh aspect, the techniques further include receiving one or more communication parameter values from the second wireless communication device. The MCS table is selected from the plurality of MCS tables based on the one or more communication parameter values.

In a forty-first aspect, in combination with the fortieth aspect, the one or more communication parameter values include a number of MIMO layers, a BWP index, a frequency range, a SCS value, a waveform type, a grant parameter value, a bandwidth value, a rank, or a combination thereof.

In a forty-second aspect, in combination with the forty first aspect, the waveform type is one of DFT-S-OFDM, CP-OFDM, or SC-QAM.

In a forty-third aspect, in combination with one or more of the thirty-sixth aspect through the forty-second aspect, the channel code rate is selected from the MCS table based on a probabilistic shaping rate, the MCS table is selected from the plurality of MCS tables based on the probabilistic shaping rate, or both.

In a forty-fourth aspect, in combination with one or more of the thirty-sixth aspect through the forty-third aspect, the techniques further include transmitting a MCS selection message to the second wireless communication device. The MCS selection message indicates the MCS table.

In a forty-fifth aspect, in combination with the forty-fourth aspect, the MCS selection message includes DCI, a MAC-CE, or a RRC message.

In a forty-sixth aspect, in combination with one or more of the thirty-sixth aspect through the forty-fifth aspect, the wireless communication device includes or corresponds to a network entity. The second wireless communication device includes or corresponds to a UE that communicates with the network entity via at least a DL channel and a UL channel.

In a forty-seventh aspect, in combination with one or more of the thirty-sixth aspect through the forty-fifth aspect, the wireless communication device includes or corresponds to a first UE. The second wireless communication device includes or corresponds to a second UE that communicates with the first UE via one or more SL channels.

In a forty-eighth aspect, in combination with one or more of the thirty-sixth aspect through the forty-seventh aspect, the techniques further include performing one or more channel measurements on a wireless communication channel with the second wireless communication device and selecting the MCS table from the plurality of MCS tables based on the one or more channel measurements.

In a forty-ninth aspect, in combination with the forty-eighth aspect, the techniques further include initiating transmission of a MCS recommendation message to the second wireless communication device. The MCS recommendation message indicates the MCS table.

In a fiftieth aspect, in combination with the forty-ninth aspect, the MCS recommendation message includes a SR, an ACK/NACK report, a CQI/CSI report, a MAC-CE, a RRC message, or UE capability signaling.

In a fifty-first aspect, in combination with one or more of the thirty-sixth aspect through the fiftieth aspect, the techniques further include selecting the MCS table from the plurality of MCS tables based on a receiver architecture of a receiver of the wireless communication device.

In a fifty-second aspect, in combination with one or more of the thirty-sixth aspect through the fifty-first aspect, the techniques further include receiving a MCS configuration message from the second wireless communication device. The MCS configuration message includes the MCS data.

In a fifty-third aspect, in combination with one or more of the thirty-sixth aspect through the fifty-second aspect, the techniques further include configuring wireless communications with the second wireless communication device according to one or more communication parameter values and selecting the MCS table from the plurality of MCS tables based on the one or more communication parameter values.

In a fifty-fourth aspect, in combination with the fifty-third aspect, the one or more communication parameter values include a number of MIMO layers, a BWP index, a frequency range, a SCS value, a waveform type, a grant parameter value, a bandwidth value, a rank, or a combination thereof.

In a fifty-fifth aspect, in combination with one or more of the fifty-third aspect through the fifty-fourth aspect, the techniques further include initiating transmission of the one or more communication parameter values to the second wireless communication device to indicate the MCS table.

In a fifty-sixth aspect, in combination with one or more of the thirty-sixth aspect through the fifty-fifth aspect, the techniques further include receiving a MCS recommendation message from the second wireless communication device. The MCS recommendation message indicates the MCS table. The techniques also include selecting the MCS table from the plurality of MCS tables based on receipt of the MCS recommendation message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for case of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a wireless communication device, the method comprising:
    encoding information in accordance with a channel code rate selected from modulation and coding scheme (MCS) data to generate encoded information, the MCS data representing a MCS table having at least one pair of entries that correspond to different modulation orders and for which a spectral efficiency associated with an entry having a higher modulation order is less than or equal to a spectral efficiency associated with an entry having a lower modulation order; and
    transmitting the encoded information to a second wireless communication device.

2. The method of claim 1, wherein a first entry of a first pair of entries of the MCS table includes a first modulation order and is associated with a first spectral efficiency, wherein a second entry of the first pair of entries includes a second modulation order that is greater than the first modulation order, wherein the second entry is associated with a second spectral efficiency that is the same as the first spectral efficiency, and wherein either the first entry or the second entry includes the channel code rate.

3. The method of claim 1, wherein a first entry of a first pair of entries of the MCS table includes a first modulation order and is associated with a first spectral efficiency, wherein a second entry of the first pair of entries includes a second modulation order that is greater than the first modulation order, wherein the second entry is associated with a second spectral efficiency that is less than the first spectral efficiency, and wherein either the first entry or the second entry includes the channel code rate.

4. The method of claim 1, further comprising:
receiving second encoded information from the second wireless communication device; and
decoding the second encoded information in accordance with the channel code rate selected from the MCS data to generate received information.

5. A wireless communication device comprising:
a memory storing processor-readable code; and
at least one processor coupled to the memory, the at least one processor configured to execute the processor-readable code to cause the at least one processor to:
encode information in accordance with a channel code rate selected from modulation and coding scheme (MCS) data to generate encoded information, the MCS data representing a MCS table having at least one pair of entries that correspond to different modulation orders and for which a spectral efficiency associated with an entry having a higher modulation order is less than or equal to a spectral efficiency associated with an entry having a lower modulation order; and
initiate transmission of the encoded information to a second wireless communication device.

6. The wireless communication device of claim 5, wherein the entry having the lower modulation order has a first index value, and where the entry having the higher modulation order has a second index value that is greater than the first index value.

7. The wireless communication device of claim 5, wherein the wireless communication device comprises a user equipment (UE), and wherein the second wireless communication device comprises a network entity that communicates with the UE via at least a downlink (DL) channel and an uplink (UL) channel.

8. The wireless communication device of claim 5, wherein the wireless communication device comprises a first user equipment (UE), and wherein the second wireless communication device comprises a second UE that communicates with the first UE via one or more sidelink (SL) channels.

9. A method of wireless communication performed by a wireless communication device, the method comprising:
encoding information in accordance with a channel code rate selected from a modulation and coding scheme (MCS) table selected from a plurality of MCS tables represented by MCS data to generate encoded information, the plurality of MCS tables corresponding to a same maximum modulation order and a same waveform type; and
transmitting the encoded information to a second wireless communication device.

10. The method of claim 9, wherein at least one MCS table of the plurality of MCS tables is designed based on an additive white Gaussian noise (AWGN) channel, and wherein at least another MCS table of the plurality of MCS tables is designed based on multiple input, multiple output (MIMO) channels.

11. The method of claim 9, further comprising:
receiving a MCS selection message from the second wireless communication device, the MCS selection message indicating the MCS table.

12. The method of claim 11, wherein the MCS selection message comprises downlink control information (DCI), a medium access control (MAC) control element (MAC-CE), or a radio resource (RRC) message.

13. The method of claim 9, further comprising:
receiving one or more communication parameter values from the second wireless communication device, wherein the MCS table is selected from the plurality of MCS tables based on the one or more communication parameter values.

14. The method of claim 13, wherein the one or more communication parameter values include a number of multiple input, multiple output (MIMO) layers, a bandwidth part (BWP) index, a frequency range, a subcarrier spacing (SCS) value, a waveform type, a grant parameter value, a bandwidth value, a rank, or a combination thereof.

15. The method of claim 14, wherein the waveform type is one of discrete Fourier transform-spread-orthogonal frequency division multiplexing (DFT-S-OFDM), cyclic prefix orthogonal frequency division multiplexing (CP-OFDM), or single-carrier quadrature amplitude modulated (SC-QAM).

16. The method of claim 9, wherein the channel code rate is selected from the MCS table based on a probabilistic shaping rate, wherein the MCS table is selected from the plurality of MCS tables based on the probabilistic shaping rate, or both.

17. The method of claim 9, further comprising:
transmitting a MCS selection message to the second wireless communication device, the MCS selection message indicating the MCS table.

18. The method of claim 17, wherein the MCS selection message comprises downlink control information (DCI), a medium access control (MAC) control element (MAC-CE), or a radio resource (RRC) message.

19. The method of claim 9, wherein the wireless communication device comprises a network entity, and wherein the second wireless communication device comprises a user equipment (UE) that communicates with the network entity via at least a downlink (DL) channel and an uplink (UL) channel.

20. The method of claim 9, wherein the wireless communication device comprises a first user equipment (UE), and wherein the second wireless communication device comprises a second UE that communicates with the first UE via one or more sidelink (SL) channels.

21. A wireless communication device comprising:
a memory storing processor-readable code; and
at least one processor coupled to the memory, the at least one processor configured to execute the processor-readable code to cause the at least one processor to:
encode information in accordance with a channel code rate selected from modulation and coding scheme (MCS) table selected from a plurality of MCS tables represented by MCS data to generate encoded information, the plurality of MCS tables corresponding to a same maximum modulation order and a same waveform type; and
initiate transmission of the encoded information to a second wireless communication device.

22. The wireless communication device of claim 21, wherein execution of the processor-readable code further causes the at least one processor to:
perform one or more channel measurements on a wireless communication channel with the second wireless communication device; and
select the MCS table from the plurality of MCS tables based on the one or more channel measurements.

23. The wireless communication device of claim 22, wherein execution of the processor-readable code further causes the at least one processor to:
  initiate transmission of a MCS recommendation message to the second wireless communication device, the MCS recommendation message indicating the MCS table.

24. The wireless communication device of claim 23, wherein the MCS recommendation message comprises a scheduling request (SR), an acknowledge/negative acknowledge (ACK/NACK) report, a channel quality indicator/channel state indicator (CQI/CSI) report, a medium access control (MAC) control element (MAC-CE), a radio resource control (RRC) message, or user equipment (UE) capability signaling.

25. The wireless communication device of claim 21, wherein execution of the processor-readable code further causes the at least one processor to:
  select the MCS table from the plurality of MCS tables based on a receiver architecture of a receiver of the wireless communication device.

26. The wireless communication device of claim 21, wherein execution of the processor-readable code further causes the at least one processor to:
  receive a MCS configuration message from the second wireless communication device, the MCS configuration message including the MCS data.

27. The wireless communication device of claim 21, wherein execution of the processor-readable code further causes the at least one processor to:
  configure wireless communications with the second wireless communication device according to one or more communication parameter values; and
  select the MCS table from the plurality of MCS tables based on the one or more communication parameter values.

28. The wireless communication device of claim 27, wherein the one or more communication parameter values include a number of multiple input, multiple output (MIMO) layers, a bandwidth part (BWP) index, a frequency range, a subcarrier spacing (SCS) value, a waveform type, a grant parameter value, a bandwidth value, a rank, or a combination thereof.

29. The wireless communication device of claim 27, wherein execution of the processor-readable code further causes the at least one processor to:
  initiate transmission of the one or more communication parameter values to the second wireless communication device to indicate the MCS table.

30. The wireless communication device of claim 21, wherein execution of the processor-readable code further causes the at least one processor to:
  receive a MCS recommendation message from the second wireless communication device, the MCS recommendation message indicating the MCS table; and
  select the MCS table from the plurality of MCS tables based on receipt of the MCS recommendation message.

* * * * *